US012498947B2

(12) United States Patent
Tworek et al.

(10) Patent No.: US 12,498,947 B2
(45) Date of Patent: Dec. 16, 2025

(54) INTERPRETING COMPUTER CODE WITH A MULTIMODAL MACHINE LEARNING MODEL

(71) Applicant: OpenAI OpCo, LLC, San Francisco, CA (US)

(72) Inventors: Jerry Tworek, San Francisco, CA (US); Nicholas Turley, San Francisco, CA (US)

(73) Assignee: OpenAI OpCo, LLC., San Francisco, CA (US)

( * ) Notice: Subject to any disclaimer, the term of this patent is extended or adjusted under 35 U.S.C. 154(b) by 0 days.

(21) Appl. No.: 19/064,670

(22) Filed: Feb. 26, 2025

(65) Prior Publication Data

US 2025/0272128 A1    Aug. 28, 2025

Related U.S. Application Data

(60) Provisional application No. 63/558,514, filed on Feb. 27, 2024.

(51) Int. Cl.
| | | |
|---|---|---|
| *G06F 11/36* | (2025.01) | |
| *G06F 8/10* | (2018.01) | |
| *G06F 8/35* | (2018.01) | |
| *G06F 8/70* | (2018.01) | |

(Continued)

(52) U.S. Cl.
CPC ............ *G06F 9/45508* (2013.01); *G06F 8/10* (2013.01); *G06F 8/35* (2013.01); *G06F 8/70* (2013.01); *G06F 11/3612* (2013.01); *G06F 21/53* (2013.01); *G06V 30/10* (2022.01); *G06V 40/161* (2022.01); *G06F 3/012* (2013.01); *G06F 3/0619* (2013.01); *G06F 3/0653* (2013.01); *G06F 3/0664* (2013.01); *G06F 3/067* (2013.01); *G06F 8/33* (2013.01); *G06F 9/5077* (2013.01);

(Continued)

(58) Field of Classification Search
CPC ...... G06F 9/45508; G06F 9/5077; G06F 8/10; G06F 8/35; G06F 8/70; G06F 8/33; G06F 11/3612; G06F 11/3608; G06F 11/0793; G06F 11/0766; G06F 21/53; G06F 40/40; G06F 40/20; G06F 40/30; G06F 3/0664; G06F 3/0619; G06F 3/0653; G06F 3/067; G06F 3/012; G06V 30/10; G06V 40/161; G06V 40/172; G06V 10/44; G06N 3/0455

See application file for complete search history.

(56) References Cited

U.S. PATENT DOCUMENTS 12,154,203 B2 *  11/2024  Alkalay ................. G06T 11/60
12,253,932 B1 *   3/2025  Schumacher ....... G06F 11/3684
(Continued)

*Primary Examiner* — Anibal Riveracruz
(74) *Attorney, Agent, or Firm* — Finnegan, Henderson, Farabow, Garrett & Dunner, LLP

(57) ABSTRACT

Disclosed herein are methods, systems, servers, and computer-readable media for interpreting computer code with a multimodal machine learning model. In an embodiment, this comprises: receiving, an input comprising at least one of a text prompt, file prompt, or data object, determining, using a multimodal machine learning model, that the input requires implementing computer code, and in response to determining the input requires implementing computer code: generating computer code based on the input, executing the generated computer code using a code interpreter, and providing, through an interface, an output based on the generated computer code.

20 Claims, 36 Drawing Sheets

(51) Int. Cl.
*G06F 9/445* (2018.01)
*G06F 9/455* (2018.01)
*G06F 11/3604* (2025.01)
*G06F 21/53* (2013.01)
*G06F 40/174* (2020.01)
*G06F 40/40* (2020.01)
*G06V 30/10* (2022.01)
*G06V 40/16* (2022.01)
*G06F 3/01* (2006.01)
*G06F 3/06* (2006.01)
*G06F 8/33* (2018.01)
*G06F 9/50* (2006.01)
*G06F 11/07* (2006.01)
*G06F 40/20* (2020.01)
*G06N 3/0455* (2023.01)
*G06V 10/44* (2022.01)

(52) U.S. Cl.
CPC ...... *G06F 11/0766* (2013.01); *G06F 11/0793* (2013.01); *G06F 11/3608* (2013.01); *G06F 40/20* (2020.01); *G06F 40/40* (2020.01); *G06N 3/0455* (2023.01); *G06V 10/44* (2022.01); *G06V 40/172* (2022.01)

(56) References Cited

U.S. PATENT DOCUMENTS

| | | | |
|---|---|---|---|
| 2024/0289362 A1* | 8/2024 | Williams | G06Q 50/01 |
| 2024/0355065 A1* | 10/2024 | Miller | G06T 19/006 |
| 2024/0404225 A1* | 12/2024 | Ghosh | G06T 7/74 |
| 2025/0001296 A1* | 1/2025 | Fulks | G06F 40/253 |
| 2025/0029192 A1* | 1/2025 | Wheeler | G06Q 40/08 |
| 2025/0029340 A1* | 1/2025 | Zhou | G06F 3/011 |
| 2025/0045148 A1* | 2/2025 | Acharya | G06F 11/079 |
| 2025/0060944 A1* | 2/2025 | Radhakrishna | G06F 40/35 |
| 2025/0063083 A1* | 2/2025 | Grinberg | G06Q 10/06393 |
| 2025/0068893 A1* | 2/2025 | Bradea | G06N 3/0475 |
| 2025/0077765 A1* | 3/2025 | Xu | G06F 40/56 |
| 2025/0077794 A1* | 3/2025 | Mikhailiuk | G06F 3/04845 |
| 2025/0085936 A1* | 3/2025 | Guttridge | G06F 8/35 |
| 2025/0104290 A1* | 3/2025 | Ding | G06V 10/44 |

\* cited by examiner

FIG. 22 what are the columns of this dataset?  — 2202 finished working    Show work

Here are the columns in the "music.csv" dataset:  — 2204

1. artist.familiarity
2. artist.hotttnesss
3. artist.id
4. artist.latitude
5. artist.location
6. artist.longitude
7. artist.name
8. artist.similar
9. artist.terms
10. artist.terms_freq
11. release.id
12. release.name
13. song.artist_mbtags
14. song.artist_mbtags_count
15. song.bars_confidence
16. song.bars_start
17. song.beats_confidence

INTERPRETING COMPUTER CODE WITH A MULTIMODAL MACHINE LEARNING MODEL

CROSS-REFERENCE TO RELATED APPLICATIONS

This application claims priority under 35 U.S.C. § 119 to U.S. Provisional Application No. 63/558,514, filed on Feb. 27, 2024. The disclosures of the above-referenced application are expressly incorporated herein by reference in its entirety.

FIELD OF DISCLOSURE

The disclosed embodiments generally relate to systems, devices, methods, and computer readable media for interpreting computer code with a multimodal machine learning model. In particular, the present disclosure relates to providing a tool associated with the multimodal machine learning model that allows for scripting, drafting, iterating, interpreting, and executing computer code.

BACKGROUND

Conventional multimodal machine learning models utilize generative artificial neural networks to process and analyze vast amounts of data. The generative artificial neural networks allow the models to utilize training data to not only better assess and analyze the data, but also to predict future trends within the provided training data. In doing so, multimodal machine learning models provide users with a wide array of tasks including the provision of data and information, the analysis of data, and the drafting of written content, among other tasks.

However, these models are limited in that they can only learn from localized data or localized training data. Such data may be out-of-date, out-of-context, or have a provincial "one-size fits all" across a variety of applications. Moreover, conventional multimodal machine learning models do not allow users to utilize programming languages or code to take advantage of the fundamental capabilities of computers to further analyze, decipher, or manipulate input data or input files. Also, conventional multimodal machine learning models may be limited in that they only emit text, and not files or images.

SUMMARY

Embodiments of the present disclosure present technological improvements as solutions to one or more technical problems in conventional systems. As such, the inventors recognized a need for a tool that not only provides the multimodal machine learning models with updated data and expanded libraries, but also allows for the appropriate manipulation of such user-provided data or files via the use of computer code or computer programming languages.

The present disclosure solves the above problems and others. For example, the present disclosure allows for the use of a tool (e.g., a plugin, a customized pre-trained model, an application programming interface (API)) with multimodal machine learning models to enhance the capabilities of multimodal machine learning models. The tool can be the "eyes and ears" of the multimodal machine learning models by providing them with access to information that may be too recent, too personal, or too specific to be included in the training data. Also, in response to user requests, the tool enables multimodal machine learning models to perform safe, constrained actions on their behalf, thereby increasing the usefulness of multimodal machine learning models overall.

Moreover, such a tool may further include a code generator (an AI model configured to generate source code) and also a code interpreter (which provides multimodal machine learning models with a working computer language interpreter). This allows multimodal machine learning models to use their programming skills to write and execute computer code, thereby providing a natural interface to the most fundamental capabilities of computers. Users may prompt the multimodal machine learning models to write computer code, run or execute computer code, fix any errors, and rewrite the computer code accordingly. Also, such a tool may allow users to upload files, run computer code in a secure environment, use the computer code to analyze or decipher the uploaded file, generate a resulting output file based on user prompts and applied computer code, and provide the output file for download. Moreover, all of this may be carried out in a sandboxed, firewalled execution environment, and may involve accessing ephemeral disk space during the session (e.g., while the tool is in use). Also, the tool can allow the multimodal machine learning models to access multiple new packages or expanded data libraries, so that the multimodal machine learning models may access files and formats it may not have libraries for, thereby significantly enhancing multimodal machine learning models. In short, the tool provides the user with a computer programmer that is eager, learned, skilled, fast, prompt, iterative, and highly responsive to feedback.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 22 illustrates a thirteenth exemplary user interface or an exemplary output of the code interpreter in accordance with some embodiments of the present disclosure.

DETAILED DESCRIPTION

Figure 1:
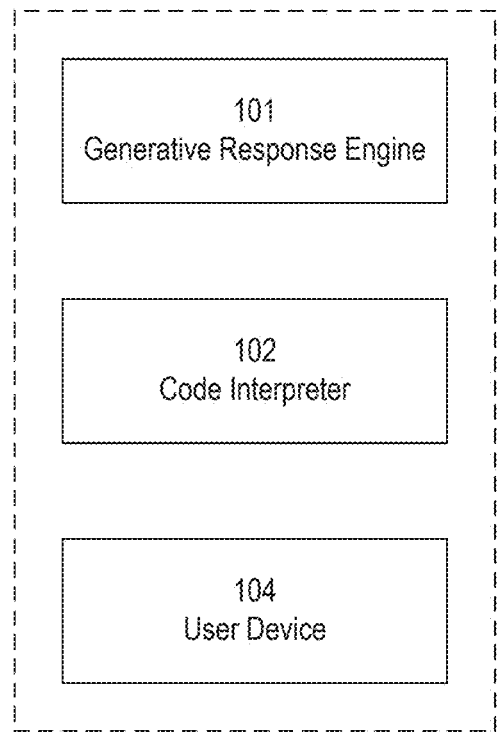
FIG. 1 illustrates a first block diagram of an exemplary system for interpreting computer code with a multimodal machine learning model according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

Multimodal machine learning models can leverage the strengths of different types of data to create more robust and versatile artificial intelligence (AI) systems. By combining data from various sources such as text, images, and audio, these models can perform a wider range of tasks with greater accuracy. For instance, a multimodal model can analyze an image while simultaneously understanding the context provided by accompanying text, leading to more precise and insightful outcomes. This integration of multiple data types allows for a deeper understanding and more comprehensive analysis, making multimodal machine learning a powerful tool in the AI landscape.

The disclosed systems, apparatus, devices, and methods are directed to improving multimodal machine learning models. The present disclosure describes systems and methods that enable new functionalities and new capabilities in machine learning models and provides solutions for improving the accuracy, efficiency, trainability, interpretation ability, and generation of responses with code interpretation.

This disclosure may be described in the general context of customized hardware capable of executing customized preloaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The embodiments discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operations to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model to improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that may lead to an improved output. The present disclosure allows the use of a tool to further enhance and technically improve the capabilities of multimodal machine learning models that enable generative AI. The tool affords these enhancements and technical improvements by providing the multimodal machine learning models with access to current information (e.g., as opposed to localized data, such as outdated training data), different functionality (e.g., by using computer capabilities), and/or third-party services (e.g., third party data or functionality). Further, the present disclosure may save computer resources. For example, the present disclosure may enable the multimodal machine learning model to access information and services stored outside of localized data, thereby saving local computer storage space. For example, allowing models to access information and services minimize the need for users to input information into the model saving the number of prompts, tokens, and/or interactions with the model. Instead of having a user type the contents of a patent publication and having the model intake and process the multiple prompts and/or tokens associated with the patent publication, the model can directly access the patent publication from services stored outside of the localized data. As another example, the systems and methods in the present disclosure can help eliminate the need for continually updating locally stored data, thereby conserving local computer storage space. With the added capabilities models can access cloud-based services and real-time data without releasing localized computer resources.

An important functionality enabled by the tool may include a code generator and a code interpreter. Code generator may include AI models configured to create source code based on user inputs and predefined templates or specifications. Code interpreter can provide multimodal machine learning models with a working computer language interpreter that has the ability to interpret, compile, and/or execute source code. This allows multimodal machine learning models to act as a programmer to write and execute computer code, thereby providing a natural interface to the most fundamental capabilities of computers. Such ability may improve the technical field of machine learning and machine learning implementation by providing improved capabilities to interpret and resolve user requests. The tool of the present disclosure may also communicate with the multimodal machine learning models to correct computer code. For example, the code generator may generate source code and the code interpreter may run or execute computer code, detect one or more errors, and provide instructions to the machine learning model to correct the one or more errors in iterative processes. In short, the tool provides the user with a computer programmer that is capable, eager, learned, fast, prompt, iterative, and highly responsive to feedback.

Indeed, the present disclosure technically improves the multimodal machine learning models that enable generative AI by enhancing a model's computer programming capabilities. Illustrative embodiments of the present disclosure are described below.

FIG. 1 illustrates a first block diagram of an exemplary system 100 for interpreting computer code with a multimodal machine learning model according to some embodiments of the present disclosure. As seen in FIG. 1, a system for interpreting computer code with a multimodal machine learning model may include a generative response engine 101, a code interpreter 102, and a user device 104. Moreover, the components and arrangements of the components in the system may vary. Thus, the system may include other components that perform or assist in the performance of one or more processes consistent with the disclosed embodiments.

In some embodiments, generative response engine 101 may be implemented as one or more computer systems having at least one processor and at least one memory. In some embodiments, generative response engine 101 may be a multimodal machine learning model that utilizes generative artificial neural networks to process and analyze vast amounts of data. In some embodiments, generative response engine 101 may be a multimodal machine learning model that utilizes AI models to process and analyze data to provide correlations and predictions. In some embodiments, generative response engine 101's multimodal machine learning model may utilize vast amounts of data as training data to train the AI models or to train the generative artificial neural networks. The generative response engine 101 may be trained on data received from a user (e.g., via user device 104), from a remote storage location (e.g., via a network connection to a remote database and/or cloud storage), and/or from a local storage location (e.g., data stored on user device 104 and/or a local database associated with system 100).

In some embodiments, code interpreter 102 may be implemented as one or more computer systems having at least one processor and at least one memory. In some embodiments, code interpreter 102 may be a tool that associates with and communicates with generative response engine 101. In some embodiments, code interpreter 102 may be a tool associated with and in communication with generative response engine 101's multimodal machine learning model. In some embodiments, code interpreter 102 may be a computer software that provides enhanced capabilities to system 100. In some embodiments, code interpreter 102 may be a tool that implements computer code in any programming language(s). In some embodiments, code interpreter 102 may be a tool that interprets and implements computer code. In some embodiments, code interpreter 102 may be a tool that receives input(s) from the user in the form of lines of source code, data, and/or files. In some embodiments, code interpreter 102 may be a tool that receives input(s) from other components in the system (e.g., the generative response engine 101) in the form of code or script (e.g., to be executed). In some embodiments, code interpreter 102 may be a tool that outputs lines of source code, data, and/or files to be presented or otherwise made available to the user, e.g., via a user interface or for download.

In some embodiments, code interpreter 102 may be a compiler that analyzes and converts inputted source code written in a computer programming language to generate machine code or bytecode that can be executed. In some embodiments, the compiler may be a cross compiler, a bootstrap compiler, a source to source or transcompiler, a decompiler, or any other type of compiler. In some embodiments, code interpreter 102 may receive (e.g., from generative response engine 101) source code in a certain programming language and convert the source code into another programming language. In some embodiments, code interpreter 102 may receive input directing it to produce results and/or output in a computer programming language different from the computer programming language of the inputted source lines. The input may be received from the user via a user interface, and API, or other direct input from the user or the input may be received from generative response engine 101, such as a multimodal machine learning model. In some embodiments, code interpreter 102 may be a compiler that utilizes a parser to convert and break down the inputted source lines. In some embodiments, the parser may be a top-down parser, a bottom-up parser, an LL (Left-to-right, leftmost deviation) parser, an LR parser (Left-to-right, Rightmost deviation in reverse), a recursive descent parser, an early parser, a shift-reduce parser, or any other type of parser.

In some embodiments, code interpreter 102 may be a tool that implements computer code in PYTHON, JAVA, JAVASCRIPT, C#, C++, SWIFT, PERL, XML, HTML or any other programming language(s). In some embodiments, code interpreter 102 may be a tool that implements computer code by generating a script and executing the script. In some embodiments, code interpreter 102 may enable the iterative generation of computer code in conjunction with generative response engine 101 by executing computer code provided by engine 101, detecting one or more errors, providing instructions to engine 101 to correct the one or more errors, and re-executing the corrected code once received. In some embodiments, code interpreter 102 may be a tool that implements computer code, wherein such computer code performs at least one of complex data transformation, computer vision, statistical analysis, data visualization, object detection, object counting, object tracking, face detection, and/or extracting text from images. In some embodiments, the code interpreter 102 may extract text from images via Optical Character Recognition (OCR).

In some embodiments, user device 104 may be implemented as one or more computer systems having at least one processor and at least one memory. In some embodiments, user device 104 may be implemented as a device. In some embodiments, user device 104 may include a user interface to allow the user to input requests. In some embodiments, user device 104 may be any device(s) used to conduct transaction(s) for a user. Such transaction(s) may include data analysis requests, computer coding requests, image analysis requests, and/or any other transaction(s). In some embodiments, user device 104 may be a smartwatch, a smartphone, a tablet, a laptop, a desktop computer, and/or any other device(s) connected to generative response engine 101 and code interpreter 102. In some embodiments, user device 104 may utilize an application programming interface (API) to communicate data with the components and/or devices of generative response engine 101 and code interpreter 102.

The user may utilize the system in FIG. 1 in any manner of ways. For example, the user may utilize user device 104 and its user interface to communicate an input in the form of text prompt, a file prompt (e.g., audio (.wav), image (.jpg), data (.csv), and/or video (.mp4) files that can serve as input), data object, and/or a combination of such inputs (e.g., in the form of a prompt). A data object may include any structured representation of information, including characteristics about the object (e.g., a data object for a car could include attributes of brand, color etc.). For example, the user may input an image file (e.g., of a book page with text and pictures) with a text prompt requesting to "extract text from the image file and identify the subject matter of the page." Thereafter, generative response engine 101 may analyze the user input and generate corresponding computer code to perform the request. For example, AI models of generative response engine 101 may determine the appropriate computer programming code to most effectively and efficiently resolve the prompt including the request of specific functions. For example, in resolving the prompt "extract text from the image" the generative response engine 101 may call and implement Optical Character Recognition (OCR) on the file to extract the text. The AI models may thus generate code or script that calls the correct library location for the OCR engine and provides instructions for the OCR engine to perform the desired text extraction.

Code interpreter 102 may then execute the code or script. In some embodiments, prior to executing the code or script, code interpreter 102 may check for errors. In some embodiments, the code interpreter may execute the code or script and determine whether the execution resulted in an error. Code interpreter 102 may provide information on the error and/or instructions to resolve the error to generative response engine 101. AI models may receive the communication and, in response, update and/or re-write the computer code or script to address the error. Code interpreter 102 may then execute the corrected code or script. This process may be performed repeatedly until code interpreter 102 can execute the code or script without encountering an error. Upon successful execution, code interpreter 102 will call the OCR engine and instruct it extract the text from the file. Thereafter, in some embodiments, code interpreter 102 and/or generative response engine may communicate with user device 104 to display the resultant text produced from the inputted image file. In some embodiments, code interpretation 102 may provide the resultant text to generative response engine, which may use AI models to identify a subject matter of the file. For example, generative response engine 101 may generate input data using the pictures of the file and the resultant text and may generate an output that identifies the subject matter by applying the input to the AI models. Thereafter, code interpreter 102 and/or generative response engine may communicate with user device 104 to display the determined subject matter.

It is appreciated that the use of code interpreter 102 tool in combination with generative response engine 101 that includes a multimodal machine learning model to script and execute the appropriate code to implement a function to resolve the prompt (e.g., in the example above the call for Optical Character Recognition (OCR)) represents a technical solution, which implements a solution rooted in computer technology rather than simply following rules. This technical solution allows the multimodal machine learning model to utilize its advanced programming skills to call upon a computing function. Therefore, this contributes to solving the complex problem of allowing the multimodal machine learning model to utilize its programming skills to harness the fundamental capabilities of computer programming and computing prowess. Moreover, it is further appreciated that such an enhancement of the capabilities of multimodal machine learning models improves multimodal machine learning models considerably by giving them access to computer programming as a means of harnessing computing prowess. Also, it is further appreciated that the human mind is not equipped to perform this operation of equipping the multimodal machine learning models with code interpreter 102 tool, given its technically and computationally complex nature of allowing the multimodal machine learning models access to programming capabilities, which goes beyond mere superposition. Further, it is appreciated that combining the multimodal machine learning models with code interpreter 102 tool forms a non-conventional and non-generic arrangement, which contributes to the enhancement of the capabilities of the multimodal machine learning models, as described above.

In another example, the user may input a file comprising data and text prompt comprising a data analysis request of the data. Such a data analysis request may include any one of complex data transformation requests, statistical analysis requests, data visualization requests, object detection requests, object tracking requests, object counting requests, and/or face detection requests, among other requests. The computer code may be in any appropriate computer language, including but not limited to PYTHON, JAVA, JAVASCRIPT, C#, C++, SWIFT, PERL, XML, HTML or any other programming language(s). Also, generative response engine 101 and its generative AI models may decide the appropriate computer programming language to utilize to most effectively and efficiently implement the pertinent data analysis request. For example, utilizing PYTHON may be more effective and efficient when performing data visualization or computer vision than JAVA, and so code interpreter 102 may utilize PYTHON accordingly. Generative AI models of response engine 101 may generate code to call the correct libraries and packages to fulfill the desired data analysis request. Then, code interpreter 102 may then execute the code or script. As described above, this process may be iterative and code interpreter 102 may communicate with generative response engine 101 to detect and correct any errors in the code. Upon successful execution, code interpreter 102 may cause the data analysis to be performed. Thereafter, code interpreter 102 and/or generative response engine 101 may communicate with user device 104 to display the resultant requested data analysis.

In some embodiments, code interpreter is a plugin. A plugin may include a software component designed to extend or enhance the functionality of a host application without modifying the application's core code. It may allow for the addition of new features or capabilities, enabling customization and flexibility in the application's behavior. Plugins may operate within the host application's environment, interacting with its Application Programming Interface (API) to execute specific tasks or provide additional services. They may typically be developed using a predefined set of rules and interfaces provided by the host application, ensuring compatibility and seamless integration. Further disclosure about the implementation and operation of plugins have been described in U.S. Pat. No. 11,922,144 (filed Mar. 20, 2023), U.S. Pat. No. 12,124,823 (filed Sep. 9, 2023), and co-pending U.S. application Ser. No. 18/476,944 (filed Sep. 28, 2023), which are incorporated by reference herein in their entireties.

Figure 2:
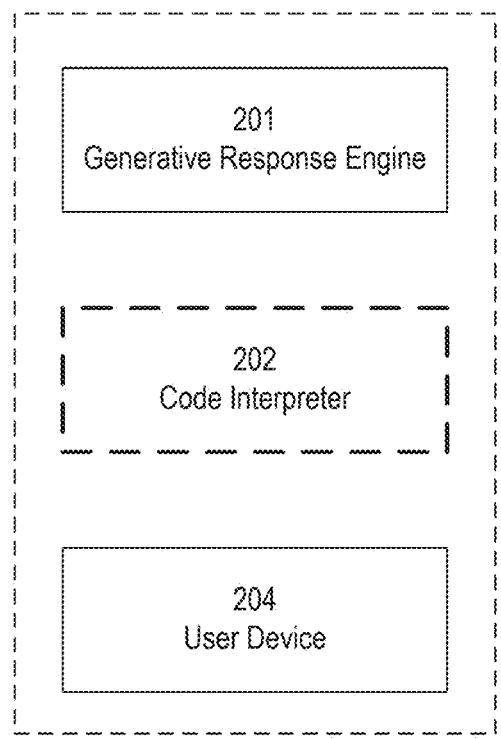
FIG. 2 illustrates a second block diagram of an exemplary system for interpreting computer code with a multimodal machine learning model according to some embodiments of the present disclosure.

FIG. 2 illustrates a second block diagram of an exemplary system 200 for interpreting computer code with a multimodal machine learning model according to some embodiments of the present disclosure. As seen in FIG. 2, the system includes a generative response engine 201, a code interpreter 202, and a user device 204. Moreover, the components and arrangements of the components in the system of FIG. 2 may vary. Thus, the system may include other components that perform or assist in the performance of one or more processes consistent with the disclosed embodiments. The components and devices in FIG. 2 may have similar components and devices as in FIG. 1.

Code interpreter 202 may be similar to code interpreter 102. However, code interpreter 202 may execute a computer code or a script in a sandboxed, firewalled execution environment. Also, code interpreter 202 may access ephemeral disk space to execute the code or script. Indeed, the user may choose to utilize code interpreter 202, especially if the inputted data is of a sensitive, secure, or personal nature, wherein the execution of code is preferably done in the aforementioned sandboxed, firewalled execution environment. Also, the user may choose to utilize code interpreter 202 to wall-off and protect the inputted data and the training data from exposure, from use by external element(s), and/or from exposure to external crawler(s). It is appreciated that the human mind is not equipped to perform this sandboxed, firewalled execution environment nature, given the comprehensive technical nature of such a protective insulation, which goes beyond simple mere blocking.

Figure 3:
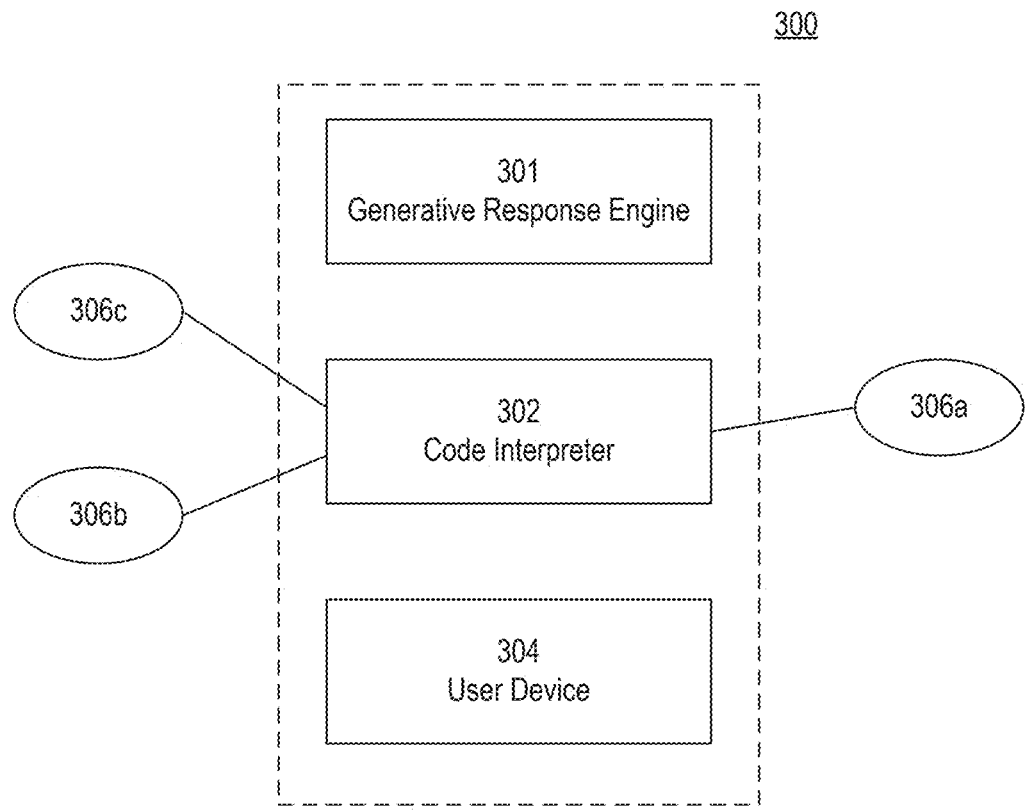
FIG. 3 illustrates a third block diagram of an exemplary system for interpreting computer code with a multimodal machine learning model according to some embodiments of the present disclosure.

FIG. 3 illustrates a third block diagram of an exemplary system 300 for interpreting computer code with a multimodal machine learning model according to some embodiments of the present disclosure. As seen in FIG. 3, the system includes a generative response engine 301, a code interpreter 302, a user device 304, and networks 306*a-c*. Moreover, the components and arrangements of the components in the system of FIG. 3 may vary. Thus, the system may include other components that perform or assist in the performance of one or more processes consistent with the disclosed embodiments. The components and devices have in FIG. 3, may have similar components and devices as in FIG. 1.

In some embodiments, code interpreter 302 may be similar to code interpreter 102. However, code interpreter 302 may execute a computer code or a script while also communicating with and/or accessing networks 306a-c.

In some embodiments, networks 306a-c may be any type of network that provides communication, exchanges information, and/or facilitates the exchange of information between the various components and devices of the system of FIG. 3. For example, in some embodiments, networks 306a-c may include a wired or wireless network, In still other embodiments, the networks 306a-c may be a larger network, the internet, intranet, a Wide Area Network (NAW), a Storage Area Network (SAN), a Metropolitan Area Network (MAN), Near Field Communication (NFC), optical code scanner, and/or any other suitable connection(s) configured to communicate data and enable the sending and receiving of information between the devices and components of the system of FIG. 3.

Indeed, the user may choose to utilize code interpreter 302 to provide code interpreter 302 with access to networks 306a-c. It is appreciated that accessing code interpreter 302 to networks 306a-c improves the system of FIG. 3 by allowing for the inclusion of more comprehensive training data, which improves generative response engine 301's generative AI models. Also, accessing code interpreter 302 to networks 306a-c allows code interpreter 302 to communicate with external sources, thereby enhancing code interpreter 302's programming knowledge, computer coding prowess, and/or scripting techniques, among other advantages. It is appreciated that combining code interpreter 302 with networks 306a-c forms a non-conventional and non-generic arrangement by exposing the multimodal machine learning models to updated training data and expanded coding libraries, which contributes to solving the concerns of conventional multimodal machines which utilize limited and out-of-date, localized data.

Figure 4:
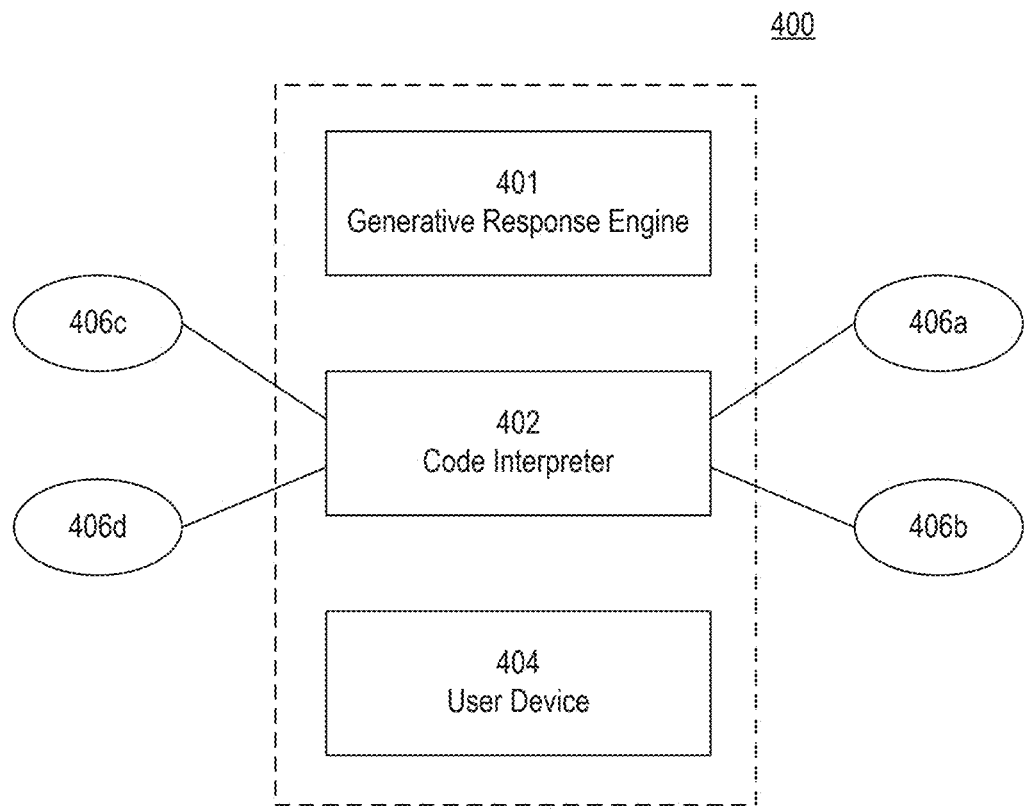
FIG. 4 illustrates a fourth block diagram of an exemplary system for interpreting computer code with a multimodal machine learning model according to some embodiments of the present disclosure.

FIG. 4 illustrates a fourth block diagram of an exemplary system 400 for interpreting computer code with a multimodal machine learning model according to some embodiments of the present disclosure. As seen in FIG. 4, the system includes a generative response engine 400, a code interpreter 402, a user device 404, and libraries 406a-d. Moreover, the components and arrangements of the components in the system of FIG. 4 may vary. Thus, the system may include other components that perform or assist in the performance of one or more processes consistent with the disclosed embodiments. The components and devices in FIG. 4 may have similar components and devices as in FIG. 1.

Code interpreter 402 may be similar to code interpreter 102. However, code interpreter 402 may execute a computer code or a script while also communicating with and/or accessing libraries 406a-d.

In some embodiments, libraries 406a-d may be expanded libraries of pre-written and reusable computer code, wherein each of libraries 406a-d can perform a set of specific tasks. For example, library 406a may include computer vision libraries, library 406b may include Optical Character Recognition (OCR) libraries, library 406c may include statistical analysis libraries, and library 406d may include data visualization libraires. This classification of libraries 406a-d is merely exemplary and is not meant to limit libraries 406a-d in any manner. Moreover, libraries 406a-d may not only be limited to libraries 406a-d, but may extend beyond to a large number of available libraries. Also, libraries 406a-d may be a collection of modules, wherein each module contains bundles of computers that can be used repeatedly in different programs. The bundles of computer code may be in any number of computer language programs, including but not limited to PYTHON, JAVA, JAVASCRIPT, C#, C++, SWIFT, PERL, XML, HTML or any other programming language(s). Also, the libraries 406a-d are configured to communicate with code interpreter 402 of FIG. 4.

Indeed, the user may choose to utilize code interpreter 402 to provide code interpreter 402 (and/or generative response engine 401) with access to libraries 406a-d or expanded libraries 406a-d. Allowing code interpreter 402 access to libraries 406a-d allows code interpreter 402 to communicate with external sources, modules of code, and programming expertise bundles, thereby enhancing code interpreter 402's and/or generative response engine 401's programming knowledge, computer coding prowess, and/or scripting techniques, among other advantages. Additionally, or alternatively, the libraries available for the system (e.g., for code generation or interpretation) may be expanded both by the user and/or automatically. For example, the user can choose to expand libraries available for code interpretation by uploading packages for code interpreter 402 to reference. A user could introduce packages for the code interpreter based on updated syntax rules or new programming languages. Further, users can dynamically add new programming packages without requiring model retraining of the code interpreter. This flexibility can enable users to upload their own package specifications or connect to external APIs that provide library details, expanding the system's code generation and interoperation capabilities. The code interpreter can then access these newly added libraries, and validate code against their features and handling dependencies.

It is appreciated that accessing code interpreter 402 to libraries 406a-d improves the system of FIG. 4 by allowing for the inclusion of more comprehensive coding capabilities, which improves generative response engine 401's general capabilities and enhances its generative AI models. Also, it is appreciated that combining code interpreter 402 with libraries 406a-d forms a non-conventional and non-generic arrangement by exposing the multimodal machine learning models to updated data and expanded coding libraries, which contributes to solving the concerns of conventional multimodal machines which utilize limited and out-of-date, localized data.

Figure 5:
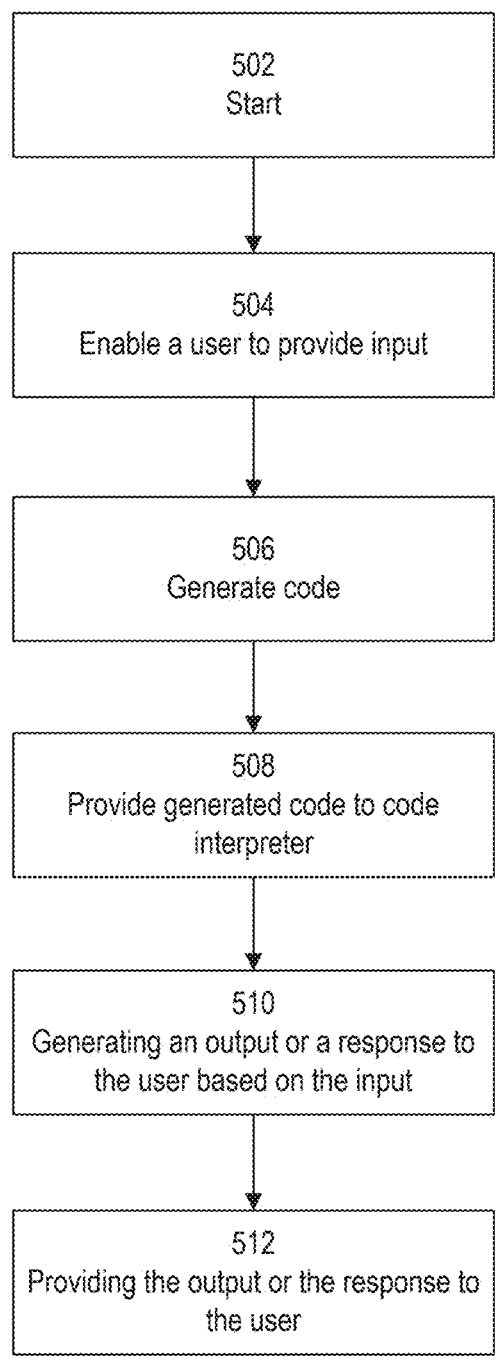
FIG. 5 is a first flow diagram illustrating an exemplary method for interpreting computer code with a multimodal machine learning model in accordance with some embodiments of the present disclosure.

FIG. 5 is a first flow diagram illustrating an exemplary method 500 for interpreting computer code with a multimodal machine learning model in accordance with some embodiments of the present disclosure. In some embodiments, method 500 may be implemented on a device. In some embodiments, method 500 may be implemented by one or more computer systems having at least one processor and at least one memory. In still other embodiments, method 500 may be implemented by a server having at least one processor, one network device connected to the at least one processor, and at least one memory device connected to the at least one processor. Method 500 for interpreting computer code with a multimodal machine learning model may include, at step 502, a start, initiating, or beginning step. This start step may be the provision of the aforementioned device, one or more computer systems, or server.

In some embodiments, the start step may include receiving a request to load a virtual assistant. For example, a user may request (e.g., via a graphic user interface) to load a virtual assistant into memory to be ready to process user input. In some embodiments, this request to load the virtual assistant can be sent at the same time as the user input, described below in step 504. The virtual assistant is a generative response engine that is adapted to exhibit customized behaviors during inference operations. These customized behaviors may be defined in configurations for the virtual assistant and/or as a result of interactions between the user and the virtual assistant.

Method 500 for interpreting computer code with a multimodal machine learning model may further include, at step 504, enabling the user to provide an input. As mentioned above and seen in FIGS. 1-4, a user may interact or provide input (e.g., requests) via user device 104. Also as mentioned above, a user may provide such input via user device's 104 user interface(s). A user may provide input in the form of text, audio, image, video, a file, a data object, a mathematical expression, a source code line, or any other prompt as an input to user device's 104 user interface(s). The text prompt by the user may be a request for data analysis such as data visualization, complex data transformation, a statistical analysis, or any other appropriate data analysis.

In some embodiments, enabling a user to provide an input may include loading a virtual assistant to receive user input, including loading any instructions that customize the behavior of the virtual assistant, and loading conversation threads that can provide the virtual assistant with context of its past performance of tasks and communications with the user.

In some embodiments, the configuration of the virtual assistant and/or user input may specify conventions that generative response engine 101 should conform to when generating code or script. For example, specified conventions may detail coding language, complexity, readability, naming conventions, architecture, and/or coding principles that the generative response engine 101 should adhere to and the generative response engine 101 may strictly comply.

Method 500 for interpreting computer code with a multimodal machine learning model may further include, at step 506, generating a code or script based on the received input (e.g., from the user interface and/or virtual assistant). As described above, multimodal machine learning models of generative response engine 101 may analyze the user input and generate corresponding computer code to most effectively and efficiently responds to the user request. In some embodiments, the code or script is generated to conform to specified conventions. In some embodiments, the code or script is generated as a result of processing performed by the virtual assistant. For example, the input processing may be informed by the configurations for the virtual assistant.

In some embodiments, generative response engine 101 may invoke a specialized code-drafting model to draft the code. In some embodiments, this code-drafting model may be separate from a model used to provide an output or response to a user request that does not require code generation. This code-drafting model may be stored as part of code interpreter 102, as part of the generative response engine 101, or as a separate tool called by the generative response engine 101.

Method for interpreting computer code with a multimodal machine learning model may further include, at step 508, providing the generated code or script to code interpreter 102. Generative response engine 101 may be in communication with code interpreter 102 and may provide the generated code or script to code interpreter 102. As mentioned above, code interpreter 102 tool may be a computer software or a tool that implements computer code in any programming language(s), thereby providing computer programming, computer coding and/or scripting capabilities to generative response engine 101's multimodal machine learning model.

While the above example details that generative response engine 101 provides the code or script to code interpreter 102, in other embodiments the code may be provided to a user (e.g., via user device 104) and the user may interact with and/or provide the code to code interpreter 102. In other embodiments, user device 104 (e.g., a front end of user device 104) may include logic and/or run a model that decides whether to give the code to code interpreter 102.

Method for interpreting computer code with a multimodal machine learning model may further include, at step 510, generating an output or a response to the user based on the input. Indeed, such an output may include the generation of an output file based on the input. For example, code interpreter 102 may execute the received code or script to generate an output or response based on the user input.

Method for interpreting computer code with a multimodal machine learning model may further include, at step 512, providing the output or the response to the user. Indeed, the output may be a visual representation of the complex data transformation, statistical analysis, or any other appropriate data analysis. Also, the output may be an output file that may be available for download through user device 104's user interface.

Figure 6:
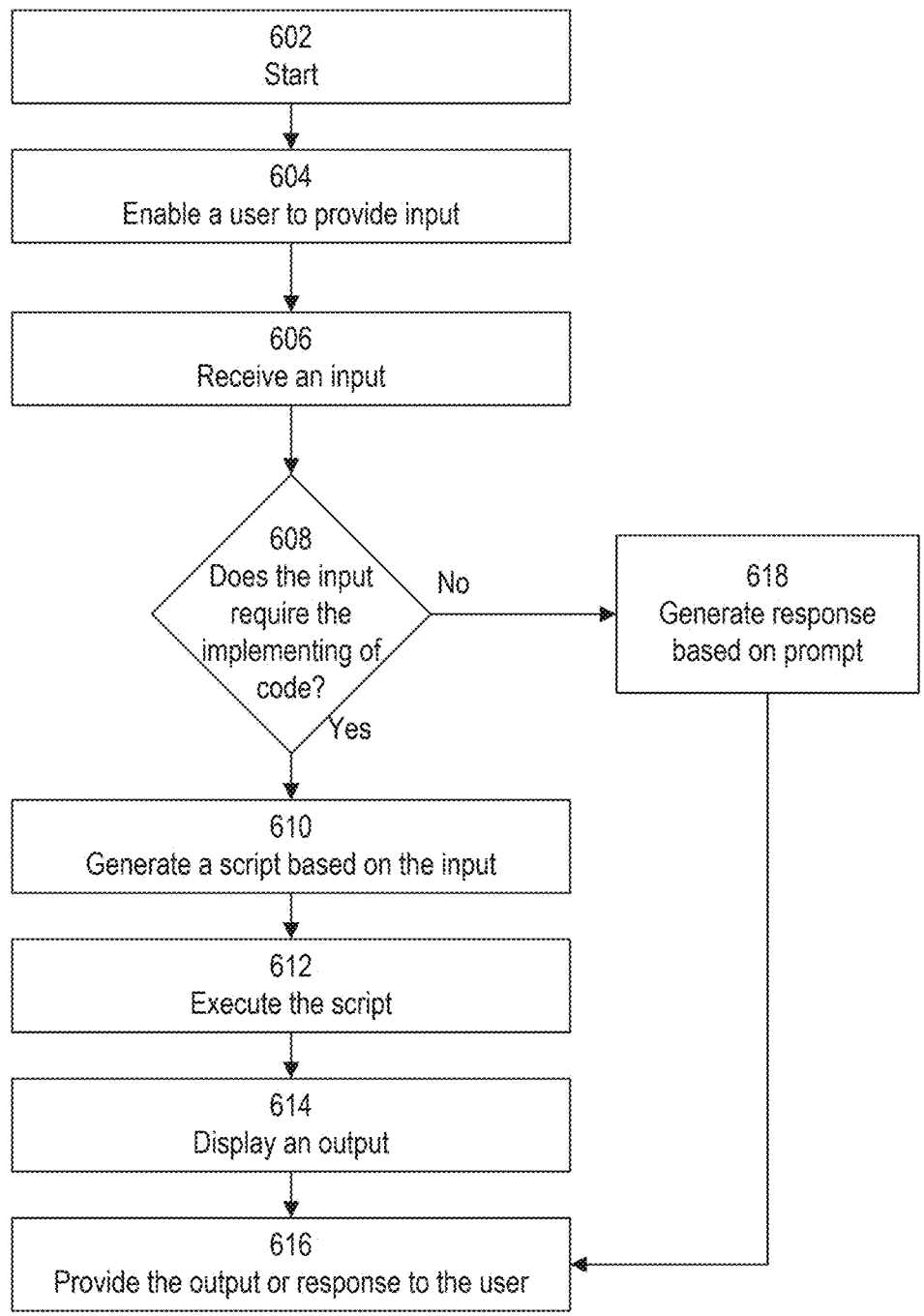
FIG. 6 is a second flow diagram illustrating an exemplary method for interpreting computer code with a multimodal machine learning model in accordance with some embodiments of the present disclosure.

FIG. 6 is a second flow diagram illustrating an exemplary method 600 for interpreting computer code with a multimodal machine learning model in accordance with some embodiments of the present disclosure. In some embodiments, method 600 may be implemented on system 100. In some embodiments, method 600 may be implemented by one or more computer systems having at least one processor and at least one memory, as further discussed in connection with FIGS. 35 and 36. In still other embodiments, method 600 may be implemented by a server having at least one processor, one network device connected to the at least one processor, and at least on memory device connected to the at least one processor as further discussed in connection with FIG. 9. Method 600 for interpreting computer code with a multimodal machine learning model may include, at step 602, a start or beginning step. This start step may be the provision of the aforementioned device, one or more computer systems, or server. As described above, the start up step may include receiving a request to load a virtual assistant.

Method 600 for interpreting computer code with a multimodal machine learning model may further include, at step 604, enabling the user to provide input. As mentioned above and seen in FIGS. 1-4, the method may include providing or provisioning code interpreter 102, wherein code interpreter 102 is associated with and in communication with generative response engine 101's multimodal machine learning model. Also as mentioned above, code interpreter 102 tool may be a computer software or a tool that implements computer code in any programming language(s), thereby providing computer programming, computer coding and/or scripting capabilities to generative response engine 101's multimodal machine learning model. Further, as described above, enabling a user to provide an input may include loading a virtual assistant to receive user input.

Method 600 for interpreting computer code with a multimodal machine learning model may further include, at step 606, receiving an input. As mentioned above and seen in FIGS. 1-4, a user may interact or provide input to code interpreter 102 tool and/or generative response engine 101 via user device 104. Also as mentioned above, a user may provide such input via user device's 104 user interface(s). As mentioned above, a user may provide text, audio, image, video, a file, a data object, a mathematical expression, a source code line, or any other prompt as an input to user device's 104 user interface(s). The text prompt by the user may be a request for data analysis such as data visualization, complex data transformation, a statistical analysis, or any other appropriate data analysis.

Method 600 for interpreting computer code with a multimodal machine learning model may further include, at step 608, a determination of whether the input requires or calls for implementing code. In some embodiments, an input may require code to be implemented when it is necessary to provide an output. In some embodiments, an input may call for code to be implemented when it provides a convenient way to respond to the input (e.g., involves less computer resources). For example, as part of method 600, a system may analyze if the aforementioned user input requires or calls for the use of computer code to provide the realization of the appropriate output. By analyzing the context and specific keywords in the prompt, the system may determine whether the input requires or calls for implementing code. This context analysis may be based on considering different factors in the user prompt. For example, keywords and phrases (e.g., prompts containing terms like "write code," "generate script," or specific programming languages (e.g., Python, JavaScript)) can trigger the system to determine the input requires or calls for implementing code. Other factors may include contextual cues. For example, the system may evaluate the overall history of prompts. If the discussion revolves around programming, software development, or specific technical tasks, it may infer that code generation is required. Other factors to determine the prompt requires implementing code can include explicit instructions (e.g., the user explicitly asks for code to be written or executed) or problem statements that the system identifies as amenable to being solved with source code (e.g., a problem that requires evaluating multiple entries in a spreadsheet to sort them).

Additionally, or alternatively, in some embodiments, determining whether the input requires or calls for implementing code can include a series of steps that may be performed by a large language model and/or a specialized model specifically configured to make the determination. For example, determining whether the input requires or calls for implementing code the system can include: First determine a query intent by identifying code-related keywords ("code," or "program"), checking programming language mentions ("Python," "JavaScript,") and identify coding-specific terminology ("algorithm," or "debug"); Second determine a pattern for code implementation by identifying in the prompt computational requests (with keywords like "calculate," or "compute"); data manipulation tasks (keywords like "sort," or "filter") or automation requests (e.g., "automate"); Third determine output requirements by identifying if the prompt has an explicit request to output source code, or if a non-code response would be too complex; Fourth determine if the prompt includes code execution signals with keywords such as "run" or "execute"; Fifth determine if context clues, like previous conversation context about programming or presence of code snippets or technical specifications, favor determining the input requires or calls for implementing code. Some implementations may include some, but not all, of these operations, and these operations can be performed in different orders (or in parallel).

In some embodiments, a machine learning model of generative response engine 101 may analyze whether user input requires or calls for code, while in other embodiments code interpreter 102 may analyze whether user input requires or calls for code. For example, the type of user input and/or the content of user input (e.g., commands or instructions) may inform whether code is required. If the aforementioned input requires or calls for the implementing of code (step 608: Yes), then method 600 continues on to step 610. If, however, the aforementioned input does not require the implementing of code (step: 608: No), then method 600 continues on to step 618.

For example, if the input includes a text prompt and an image file wherein the text prompt requests the detection of a face in the inputted image file, then (at step 608: Yes/No) a processor may determine that such an input may require the implementing of code (step 608: Yes/No), as such an input requires or calls for the use of computer code in computer vision libraries to detect a face in the image. Therefore, method 600 may continue on to step 610. Also by way of example, if the input includes a text prompt and an excel file wherein the text prompt requests for the number of rows and columns in the excel file, then, at step 608, a processor or device (e.g., generative response engine 101) may again determine that such an input may require the implementing of code, as such an input requires or calls for the use of computer code in statistical analysis libraries or data analysis libraries to arrive at the number of rows and columns in the inputted excel file. Therefore, method 600 may continue on to step 610. However, if the input merely asks for information that may be readily collected from the localized training data, then, at step 608 (Yes/No), a processor may determine that such an input does not require the implementing of code. Here, method 600 may continue to step 618.

Method 600 for interpreting computer code with a multimodal machine learning model may further include, at step 618, generating a response based on the input. As mentioned above, at this stage in method 600, it has been determined that the input does not require the implementing of code. For example, if the user asks for information that is readily available or readily collectable from the localized training data and does not require the implementing of code, then method 600 may, at step 618, generate a response based on this input. Thereafter, method 600 may continue to step 616.

Method 600 for interpreting computer code with a multimodal machine learning model may further include, at step 610, generating a code or script based on the input. As mentioned above, at this stage in method 600, it has been determined that the input does require the implementation of code. For example, as mentioned above, if the input requires or calls for the use of computer code from computer vision libraries or data analysis libraries, then method 600 may, at step 610, generate the required script based on the input. As described above, in some embodiments, a specialized code drafting model may be invoked to draft the code.

Method 600 for interpreting computer code with a multimodal machine learning model may further include, at step 612, executing the code or script. For example, as mentioned above, if the input requires or calls for the use of computer code from computer vision libraries or data analysis libraries, then method 600 may, at step 612, execute the code or script that was generated in step 610.

Method 600 for interpreting computer code with a multimodal machine learning model may further include, at step 614, displaying an output. For example, as mentioned above, after executing the code or script, method 600 may, at step 614, display the output visually in user device 104's user interface.

Method 600 for interpreting computer code with a multimodal machine learning model may further include, at step 616, providing the output or response to the user. For example, method 600 may, at step 616, display the output via the provision of an output file to the user, wherein the output file may be available for download by the user.

Figure 7:
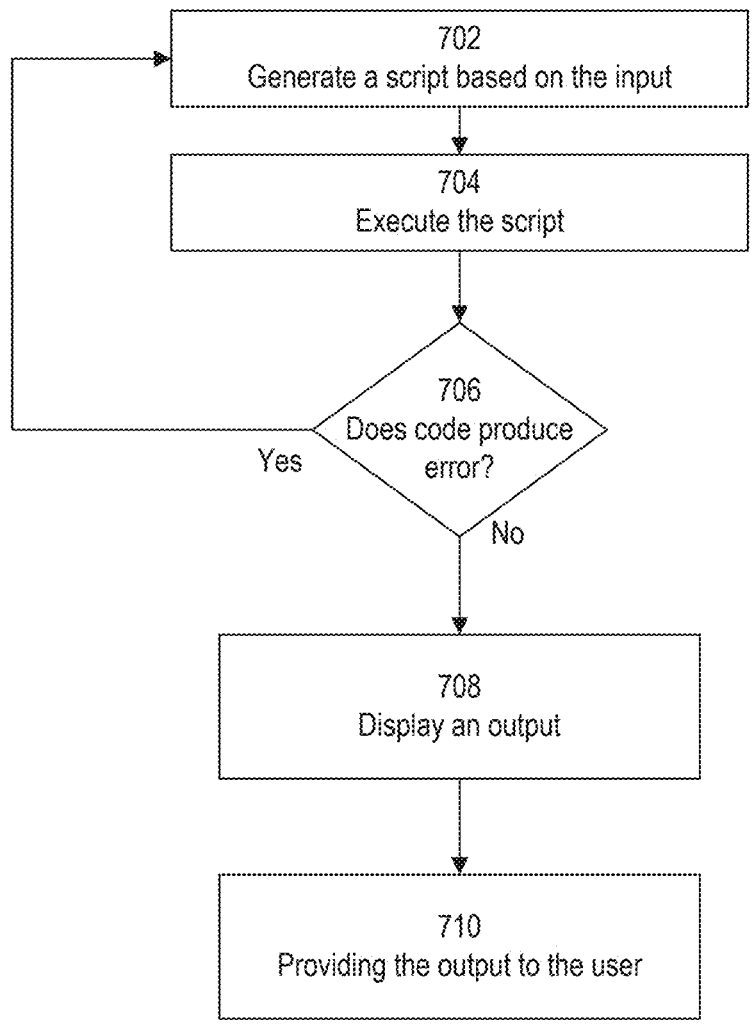
FIG. 7 is a third flow diagram illustrating an exemplary method for interpreting computer code with a multimodal machine learning model in accordance with some embodiments of the present disclosure.

FIG. 7 is a third flow diagram illustrating an exemplary method 700 for interpreting computer code with a multimodal machine learning model in accordance with some embodiments of the present disclosure. In some embodiments, method 700 may be implemented on a device. In some embodiments, method 700 may be implemented by one or more computer systems having at least one processor and at least one memory. In still other embodiments, method 700 may be implemented by a server having at least one processor, one network device connected to the at least one processor, and at least one memory device connected to the at least one processor. Indeed, method 700 for interpreting computer code with a multimodal machine learning model delves into the iterative computer coding process. Method 700 may include, at step 702, generating a code or script based on the input. As mentioned above, when the user provides input that requires the implementation of code to achieve the desired output, then method 700, at step 702, generates the required code or script based on the pertinent input. As described above, in some embodiments, a specialized code drafting model may be invoked to draft the code.

Method 700 for interpreting computer code with a multimodal machine learning model may further include, at step 704, executing the code or script. For example, as mentioned above, if the input requires or calls for the use of computer code from computer vision libraries or data analysis libraries, then method 700 may, at step 704, execute the code or script that was generated in step 702 (e.g., via code interpreter 102).

Method 700 for interpreting computer code with a multimodal machine learning model may further include, at step 706, a conditional operation that may be yes/no determination. For example, a processor may be configured to determine whether the code produces an error. For example, a system (e.g., code interpreter 102) may analyze if the aforementioned code or script that runs the computer code produces an error. In some embodiments, an error is detected by comparing the code to pre-stored requirements, such as syntax requirements, logic requirements, and/or naming conventions. In some embodiments, an error is detected by attempting to execute the code or script and receiving a response indicating failure (e.g., a runtime error). If the computer code produces an error, then method 700 reverts back to step 702 and generates the code or script anew. If, however, the computer code does not produce an error, then method 700 continues to step 708.

Method 700 for interpreting computer code with a multimodal machine learning model may further include, at step 708, displaying an output. For example, as mentioned above, after executing the code or script and not producing an error, method 700 may, at step 708, display the output visually in user device 104's user interface.

Method 700 for interpreting computer code with a multimodal machine learning model may further include, at step 710, providing the output to the user. For example, method 700 may, at step 710, display the output via the provision of an output file to the user, wherein the output file may be available for download by the user.

Figure 8:
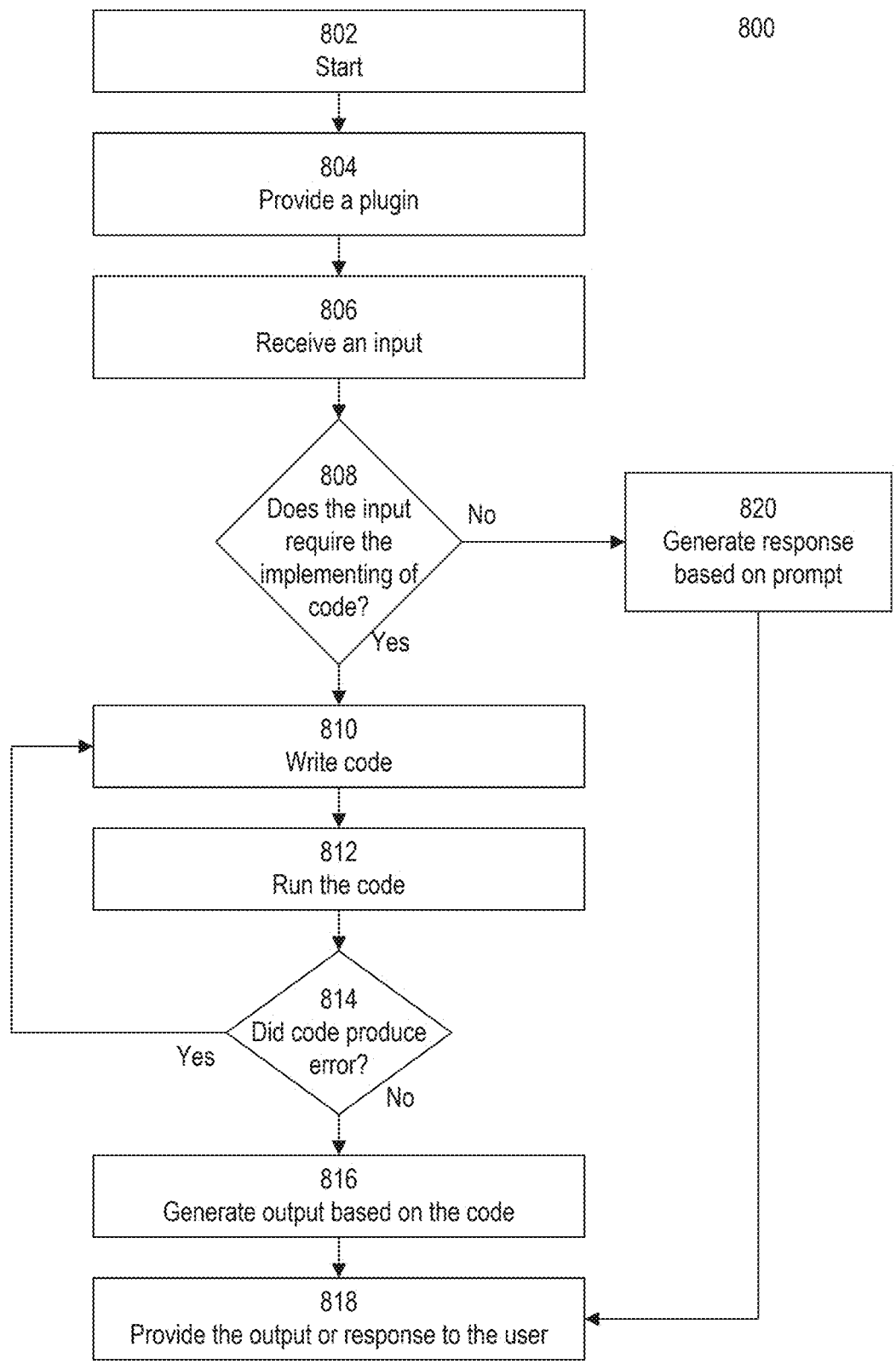
FIG. 8 is a fourth flow diagram illustrating an exemplary method for interpreting computer code with a multimodal machine learning model in accordance with some embodiments of the present disclosure.

FIG. 8 is a fourth flow diagram illustrating an exemplary method 800 for interpreting computer code with a multimodal machine learning model in accordance with some embodiments of the present disclosure. In some embodiments, method 800 may be implemented on a device or system as discussed in connection with FIGS. 35 and 36. In some embodiments, method 800 may be implemented by one or more computer systems having at least one processor and at least one memory. In still other embodiments, method 800 may be implemented by a server having at least one processor, one network device connected to the at least one processor, and at least one memory device connected to the at least one processor. Method 800 for interpreting computer code with a multimodal machine learning model may include, at step 802, a start, initiating, or beginning step. This start step may be the provision of the aforementioned device, one or more computer systems, or server. As described above, the start up step may include receiving a request to load a virtual assistant.

Method 800 for interpreting computer code with a multimodal machine learning model may further include, at step 804, enabling the user to provide input. As mentioned above and seen in FIGS. 1-4, the method may include providing or provisioning code interpreter 102, wherein code interpreter 102 tool may be associated with and in communication with generative response engine 101's multimodal machine learning model. Also as mentioned above, code interpreter 102 tool may be a computer software or a tool that implements computer code in any programming language(s), thereby providing computer programming, computer coding and/or scripting capabilities to generative response engine 101's multimodal machine learning model. Further, as described above, enabling a user to provide an input may include loading a virtual assistant to receive user input.

Method 800 for interpreting computer code with a multimodal machine learning model may further include, at step 806, receiving an input. As mentioned above and seen in FIGS. 1-4, a user may interact or provide input to code interpreter 102 tool and/or generative response engine 101 via user device 104. Also as mentioned above, a user may provide such input via user device's 104 user interface(s). As mentioned above, a user may provide text, audio, image, video, a file, a data object, a mathematical expression, a source code line, or any other prompt as an input to user device's 104 user interface(s). The text prompt by the user may be a request for data analysis such as data visualization, complex data transformation, a statistical analysis, or any other appropriate data analysis.

Method 800 for interpreting computer code with a multimodal machine learning model may further include, at step 808, a conditional operation that may be a binary determination (e.g., a yes/no question). In this step, a processor may determine whether the input require the implementing of code. For example, here method 800 or system may analyze if the aforementioned user input requires or calls for the use of computer code to provide the realization of the appropriate output. If the aforementioned input requires or calls for the implementing of code, then method 800 may continue on to step 810. If, however, the aforementioned input does not require the implementing of code, then method 800 may continue on to step 820.

For example, if the input includes a text prompt and an image file wherein the text prompt requests the detection of a face in the inputted image file, then step 808 may determine that such an input may require the implementing of code (step 808: Yes), as such an input requires or calls for the use of computer code in computer vision libraries to detect a face in the image. Therefore, method 800 may continue on to step 810. Also by way of example, if the input includes a text prompt and an excel file wherein the text prompt requests for the number of rows and columns in the excel file, then (at step 808) a processor may again determine that such an input may require the implementing of code, as such an input requires or calls for the use of computer code in statistical analysis libraries or data analysis libraries to arrive at the number of rows and columns in the inputted excel file. Therefore, method 800 may continue on to step 810. However, if the input merely asks for information that may be readily collected from the localized training data, then (at step 808) a processor may determine that such an input does not require the implementing of code. Here, method 800 may continue on to step 820.

Method 800 for interpreting computer code with a multimodal machine learning model may further include, at step 820, generating a response based on the input. As mentioned above, at this stage in method 800, it has been determined that the input does not require the implementing of code. For example, if the user asks for information that is readily available or readily collectable from the localized training data and does not require the implementing of code, then method 800 may, at step 820, generate a response based on this input. Thereafter, method 800 may continue to step 818.

Method 800 for interpreting computer code with a multimodal machine learning model may further include, at step 810, writing code. The code may be written based on the user input provided via the user device 104's user interface. As mentioned above, at this stage in method 800, it has been determined that the input does require the implementing of code. For example, as mentioned above, if the input requires or calls for the use of computer code from computer vision libraries or data analysis libraries, then method 800 may, at step 810, write the code (e.g., via machine learning models of generative response engine 101). As described above, in some embodiments, a specialized code drafting model may be invoked to draft the code.

Method 800 for interpreting computer code with a multimodal machine learning model may further include, at step 812, running the code (e.g., via code interpreter 102). For example, as mentioned above, if the input requires or calls for the use of computer code from computer vision libraries or data analysis libraries, then method 800 may, at step 812, running the code that was written in step 810.

Method 800 for interpreting computer code with a multimodal machine learning model may further include, at step 814, a conditional operation that may be a binary determination (e.g., yes/no question). For example, the determination may be whether the code produced an error. Here, method 800 or system (e.g., code interpreter 102) may analyze if the aforementioned written code computer code produces an error. If the computer code produces an error, then method 800 may revert back to step 810 and may generate the computer code anew. If, however, the computer code does not produce an error, then method 800 may continue to step 816.

Method 800 for interpreting computer code with a multimodal machine learning model may further include, at step 816, generating an output or a response to the user based on the code. Indeed, such an output may include the generation of an output file based on the input or the computer code. For example, as mentioned above, after running the computer code and not producing an error, method 800 may, at step 816, generate the output based on the input or computer code accordingly.

Method 800 for interpreting computer code with a multimodal machine learning model may further include, at step 818, providing the output or the response to the user. For example, method 800 may, at step 818, display the output via the provision of an output file to the user, wherein the output file may be available for download by the user.

Figure 9:
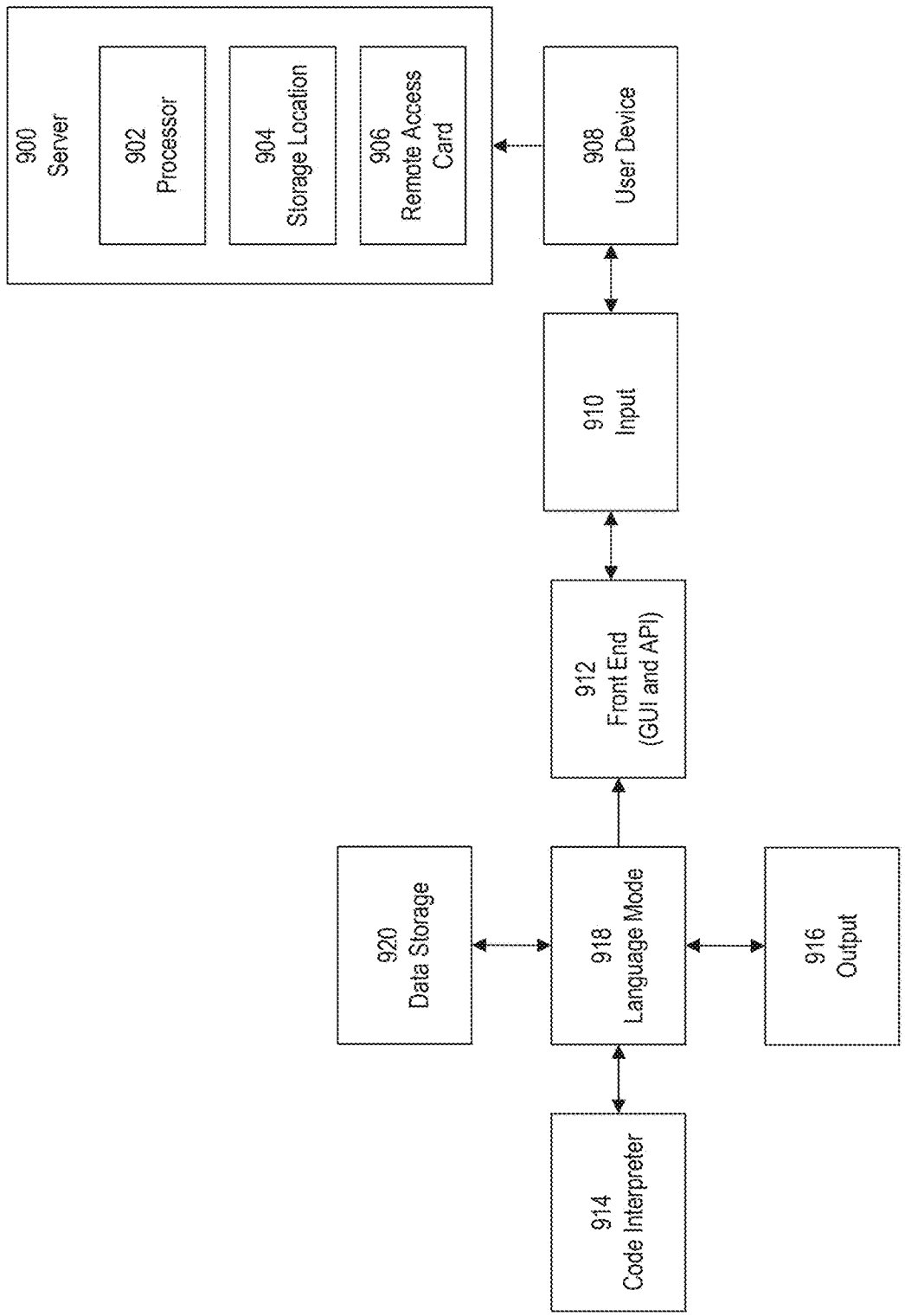
FIG. 9 illustrates a block diagram of an exemplary system for interacting with a multimodal machine learning model according to some embodiments of the present disclosure.

FIG. 9 is a block diagram of an exemplary system for interacting with a multimodal machine learning model according to some embodiments of the present disclosure. As seen in FIG. 9, the system includes a server 900, a processor 902, a storage location 904, a remote access card 906, a user device 908, an input 910, a front end 912, a code interpreter 914, an output 916, a language model 918, and a data storage 920. Moreover, the components and arrangements of the components in the system may vary. Thus, the system may include other components that perform or assist in the performance of one or more processes consistent with the disclosed embodiments.

In some embodiments, server 900 may be a software or hardware device that accepts and responds to requests made over a network. In some embodiments, server 900 may be a software or hardware device that provides functionality for other programs, devices or "clients." In some embodiments, server 900 may be a computer system that receives requests for web files and sends those files to other systems, devices, or clients. In some embodiments, server 900 may be a powerful machine system to compute, store, and manage data, devices, and/or systems over a network. In some embodiments, server 900 may be a computer system that provides resources to networking units to render specialized services such as processing and analyzing data, displaying webpages, and/or sending or receiving emails, amongst other specialized services. In some embodiments, server 900 may be a web server, a mail server, an application server, a database server, a Domain Name System (DNS) server, a proxy server, a Dynamic host configuration protocol (DHCP) server, or a file server, amongst other types of servers.

In some embodiments, processor 902 may be a main component of any server. In some embodiments, processor 902 may be hardware device that processes data or information. In some embodiments, processor 902 may be an integrated electronic circuit that performs calculations to run a computer. In some embodiments, processor 902 may include one or more known processing devices.

In some embodiments, storage location 904 may be implemented as one or more computer systems having at least one processor and at least one memory. In some embodiments, storage location 904 may be storage components to store various files necessary for executing machine code and operating system files, libraries, databases, website data, application data, amongst others. In some embodiments, storage location 904 may be traditional hard drives and solid-state drives (SSDs). In some embodiments, storage location 904 may be data systems, wherein such data systems may be configured to store data, receive data, provide data, communicate data, and/or process data. In some embodiments, storage location 904 may be data centers, data farms, and/or server farms.

In some embodiments, remote access card 906 may be a piece of hardware that allows for access to a server, system and/or facilities. In some embodiments, remote access card 906 may be a card, key, and/or password that allows for access to a server, system and/or facilities. In some embodiments, remote access card 906 may be a hardware that allows a means to access and manage a server via a second and physically separate network connection. In some embodiments, user device 908 may be implemented as one or more computer systems having at least one processor and at least one memory. In some embodiments, user device 908 may be implemented as a device. In some embodiments, user device 908 may include a user interface to allow the user to input requests. In some embodiments, user device 908 may be any device(s) used to conduct transaction(s) for a user. Such transaction(s) may include data analysis request, computer coding requests, image analysis request, and/or any other transaction(s). In some embodiments, user device 908 may be a smartwatch, a smartphone, a tablet, a laptop, a desktop computer, and/or any other device(s).

In some embodiments, input 910 may be text, a file, audio, image, video, a data object, and/or a combination of such inputs from a user. The user may utilize user device 908 to provide input 910 via front end 912. In some embodiments, input 910 may be a file that includes data and a text prompt that include a data analysis request of the file. In some embodiments, input 910 may include inputted image files, training data, source code lines, computer coding requests, mathematical expressions, and image analysis requests, amongst other requests.

In some embodiments, front end 912 encompasses a graphical user interface and Application Programming Interfaces (APIs) that facilitate communication, input processing, and output presentation. The graphical user interface may include a digital interface or a user interface that allows the user to interact with user device 908 by providing appropriate input 910. In some embodiments, the graphical user interface may include graphical components such as icons, buttons, and/or menus on a screen or monitor. In some embodiments, the graphical user interface may include audio input devices that allow a user to provide audio input commands. In some embodiments, the graphical user interface may include a touch screen that allows a user to input touch-based input commands. In some embodiments, the graphical user interface may include a mouse or keyboard that allow a user to input appropriate commands.

In some embodiments, the APIs may enable developers to integrate the language model 918's capabilities into external applications and services. They may provide programmatic access, allowing for customized interactions and functionalities. The APIs may accept structured requests containing prompts, context, and configuration parameters. For example, an API can be used to provide prompts and divide the prompt into system prompts and user prompts. In some embodiments, the APIs can provide specific inputs for which language model 918 is configured to respond with a specific behavior. For example, an API can be used to specify that it requires an output and/or a generated code in a particular format or structured output.

While not shown, in some embodiments, an assistant service (e.g., for a virtual assistant application) may also be implemented between the front end 912 and language models 918 and/or code interpreter 914. For example, the assistance service may configure the language models 918 (and/or associated computers, servers, or engines, such as generative response engine 101) to act like an assistant. This can involve giving specific system instructions (i.e., a system message), giving access to a specific set of knowledge, giving access to particular tools (e.g., code generation tool), and enabling a long conversation context window so that context from previous conversations is provided.

In some embodiments, code interpreter 914 may be implemented as one or more computer systems having at least one processor and at least one memory. In some embodiments, code interpreter 914 may be a tool that associates with and communicates with user device 908 via input 910 provided from the user through front end 912. In some embodiments, code interpreter 914 may be a tool associated with and in communication with language model 918. In some embodiments, code interpreter 914 may be a computer software that provides enhanced capabilities to language model 918. In some embodiments, code interpreter 914 may an execution environment for code that is in communication with and under the control of language models 918. In some embodiments, code interpreter 914 may be a tool that implements computer code in any programming language(s) (e.g., code received from language model 918). In some embodiments, code interpreter 914 may be a tool that interprets and implements computer code.

In some embodiments, code interpreter 914 may be a compiler that analyzes and converts inputted source code lines in a written computer programming language to generate machine code or bytecode that can be executed. In some embodiments, the compiler may be a cross compiler, a bootstrap compiler, a source to source or transcompiler, a decompiler, or any other type of compiler. In some embodiments, code interpreter 914 may receive source code in a certain programming language and convert the source code into another programming language. In some embodiments, code interpreter 914 may be a compiler that utilizes a parser to convert and break down the inputted source lines. In some embodiments, the parser may be a top-down parser, a bottom-up parser, an LL (Left-to-right, leftmost deviation) parser, an LR parser (Left-to-right, Rightmost deviation in reverse), a recursive descent parser, an early parser, a shift-reduce parser, or any other type of parser.

In some embodiments, code interpreter 914 may be a tool that implements computer code in PYTHON, JAVA, JAVASCRIPT, C#, C++, SWIFT, PERL, XML, HTML or any other programming language(s). In some embodiments, code interpreter 914 may be a tool that implements computer code by generating a script and executing the script. In some embodiments, code interpreter 914 may be a tool that detects errors, communicates the errors (e.g., to language models 918), and executes the corrected code or script. In some embodiments, code interpreter 914 may be a tool that implements computer code, wherein such computer code performs at least one of complex data transformation, computer vision, statistical analysis, data visualization, object detection, object counting, object tracking, face detection, and/or extracting text from images. In some embodiments, code interpreter 914 may extract text from images via Optical Character Recognition (OCR).

While the above figure and corresponding description include code interpreter 914 in communication with language models 918 to run or execute computer code, in some embodiments code interpreter 914 may act as a tool that receives input 910 from and/or provides output 916 to user device 908 via front end 912 in the form of source code line, data, and/or files. In some embodiments, code interpreter 914 may receive input 910 from user device 908 via front end 912 and thereafter produce results and/or output 916 in a computer programming language different from the computer programming language of the inputted source lines.

In some embodiments, output 916 may be text, audio, image, video, a file, a file for download, a data object, a data object for download, data visualization, data transformation, source code lines, and/or a combination of such outputs. Output 916 may be outputted via front end 912. In some embodiments, output 916 may be a file that includes data and a text prompt that includes a data analysis of the file. In some embodiments, output 916 includes outputted image files, training data, source code lines, computer coding, mathematical expressions, and image analyses, amongst other outputs.

In some embodiments, language model 918 may be a multimodal machine learning model. In some embodiments, language model 918 may be a multimodal machine learning model that enables generative AI. In some embodiments, language model 918 may be a probabilistic model of a natural language that can generate probabilities of a series of words based on training data. In some embodiments, language model 918 may be a multimodal machine learning model that utilizes generative artificial neural networks to process and analyze vast amounts of data. In some embodiments, language model 918 may be a multimodal machine learning model that utilizes AI models to process and analyze data to provide correlations and predictions. In some embodiments, language model 918 may utilize the vast amounts of data as training data to train the AI models or to train the generative artificial neural networks. In some embodiments, language model 918 may be a multimodal machine learning model that may analyze a variety of different inputs to provide an output or response. For example, the multimodal machine learning model may analyze a combination of text, audio, image, and/or video inputs to provide an output or response.

In some embodiments, language model 918 may be a Large Language Model (LLM). In some embodiments, language model 918 may be an LLM that uses an AI accelerator, which may be class of specialized hardware accelerator or computer system that accelerates AI and machine learning applications such as artificial neural networks and machine vision to process vast amounts of text training data. In some embodiments, language model 918 may be an LLM that uses artificial neural networks that include multiple step iterative processes, wherein such iterative processes include continuous forward propagation, error calculation, and backward propagation to update and improve the artificial neural networks' weights and biases parameters, thereby gradually improving the artificial neural network's performance and reducing its error.

In some embodiments, data storage 920 may be implemented as one or more computer systems having at least one storage processor and at least one memory. In some embodiments, data storage 920 may be implemented as a device. In some embodiments, data storage 920 may be a data storage system used for cloud-based storage, file-based storage, or object storage. In some embodiments, data storage 920 may be a storage area network (SAN) and/or a storage area network (SAN) that may be a modular SAN array, a monolithic SAN array, and/or a utility storage array. In some embodiments, data storage 920 may be a disk storage system that includes multiple disk drives, disk array controllers, and/or network attached storage (NAS). In some embodiments, data storage 920 may be implemented as data centers, data farms, and/or server farms. In still other embodiments, data storage 920 may be configured to store data, receive data, provide data, communicate data, and/or process data. In some embodiments, data storage 920 may be configured to store data in a read-only matter to make the data immutable and, thus, protected.

As seen in FIG. 9, the user may utilize a graphical user interface of user device 908 to provide input 910. Also as seen in FIG. 9, user device 908 may be a device with significant processing capabilities, one that has access to server 900 that further includes processor 902, storage location 904, and remote access card 906. Input 910 may be, as mentioned above, any one of text, audio, image, video, a file, a data object, inputted image files, training data, source code lines, computer coding requests, mathematical expressions, image analysis requests, and/or a combination of such inputs from the user. Thereafter, if input 910 requires the use of computer code or computer programming to perform the task, then language model 918 may work with code interpreter 914 to provide necessary output 916. As mentioned above, output 916 may be any one of text, audio, image, video, a file, a file for download, a data object, a data object for download, data visualization, data transformation, source code lines, outputted image files, training data, source code lines, computer coding, mathematical expressions, image analyses, and/or a combination of such outputs. Also as mentioned above, language model 918 may be an AI-trained language model that uses artificial neural networks on vast amounts of training data. Indeed, the training data may be stored in data storage 920, and language model 918 may communicate with data storage 920 as need be.

FIGS. 10-34 illustrate various embodiments of exemplary code interpreters in accordance with some embodiments of the present disclosure.

Figure 10:
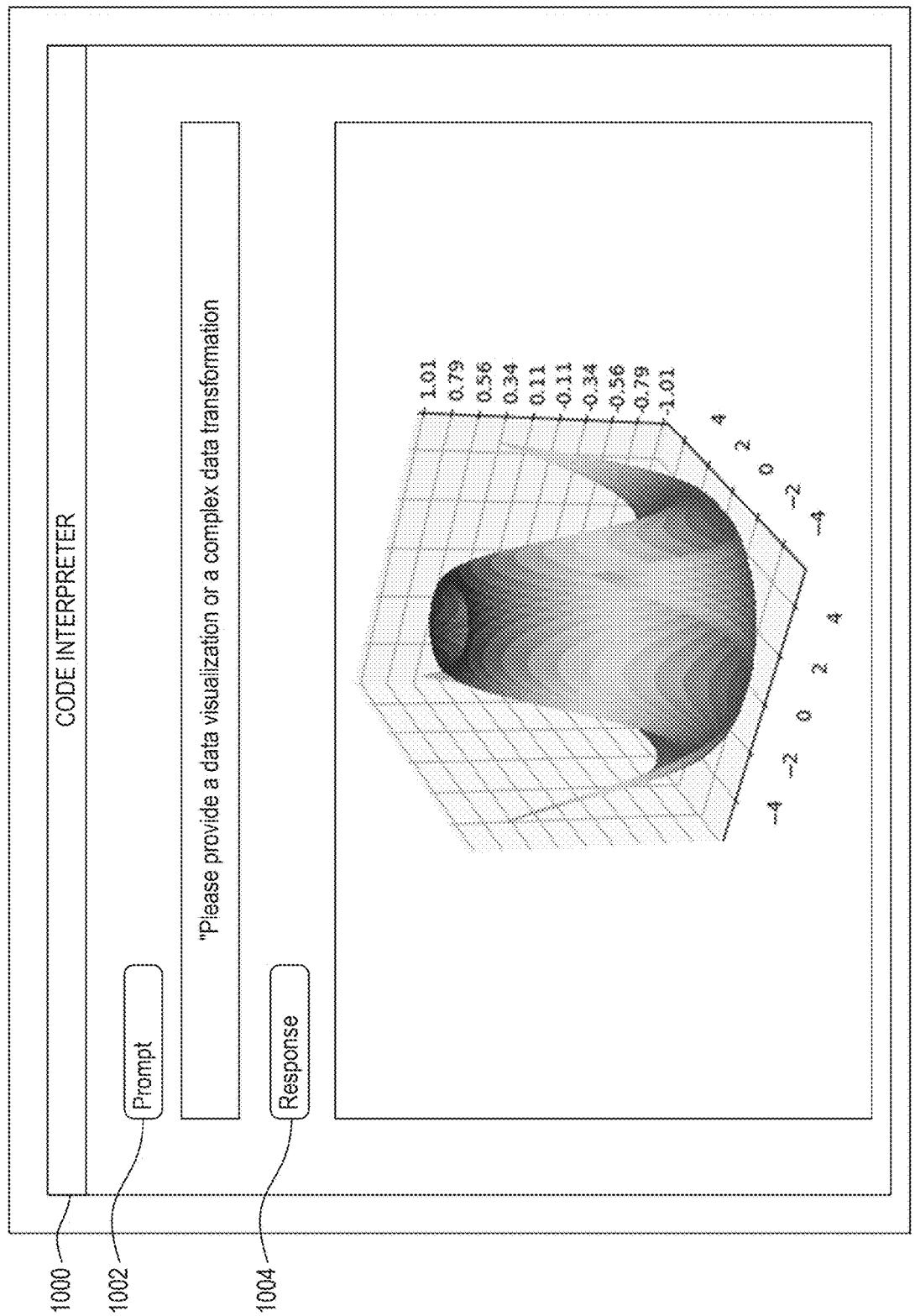
FIG. 10 illustrates a first exemplary user interface displaying outputs of code interpreter in accordance with some embodiments of the present disclosure.

FIG. 10 illustrates a first exemplary user interface displaying outputs of code interpreter in accordance with some embodiments of the present disclosure. FIG. 10 shows an exemplary code interpreter 1000 that includes a prompt 1002 and a response 1004. In this embodiment, the user may utilize prompt 1002 to input a data visualization request or a complex data transformation request. As seen in prompt 1002, the user may input "please provide a data visualization or a complex data transformation." Thereafter, a machine learning model generates code or script based on the prompt. Code interpreter 1000 executes the code or script, wherein the execution includes performing a data visualization or a complex data transformation. After which, as can be seen in response 1004, code interpreter 1000 displays, through the user interface, such an output that includes the data visualization or a complex data transformation.

Figure 11:
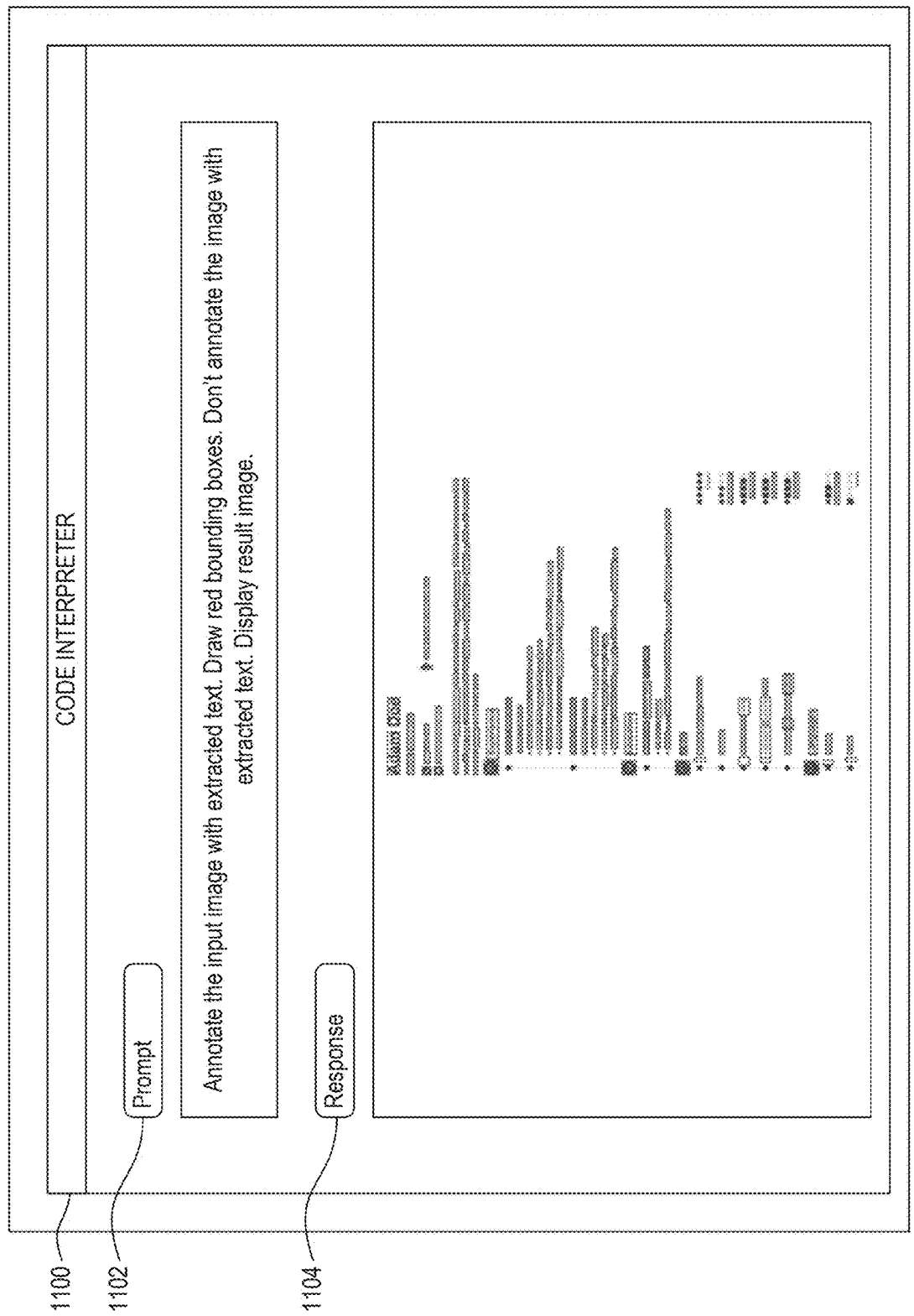
FIG. 11 illustrates second exemplary user interface in accordance with some embodiments of the present disclosure.

FIG. 11 illustrates a second exemplary user interface in accordance with some embodiments of the present disclosure. FIG. 11 shows an exemplary code interpreter 1100 that includes a prompt 1102 and a response 1104. In this embodiment, the user may utilize prompt 1102 to input text prompt 1102 request that reads: "annotate the input image with extracted text. Draw red bounding boxes. Don't annotate the image with extracted text. Display result image." In this embodiment, the user may also input an image file along with text prompt 1102. Code interpreter 1100 and/or a machine learning model determines that text prompt 1102 requires the implementing of code. Thereafter, a machine learning model generates code or script based on the prompt. Code interpreter 1000 executes the code or script, wherein the execution includes performing the detection of objects, specifically the extracted text, via the drawing of "red bounding boxes," as seen in FIG. 11. Also, as seen in FIG. 11, the execution of the computer code script may include the implementation of tools or functions for capturing information for code implementation. For example, as illustrated in FIG. 11, in implementing computer code the disclosed system may include the extraction of text from the inputted image file via Optical Character Recognition (OCR). As further seen in FIG. 11, response 1104 includes displaying, through the user interface, the requested output.

Figure 12:
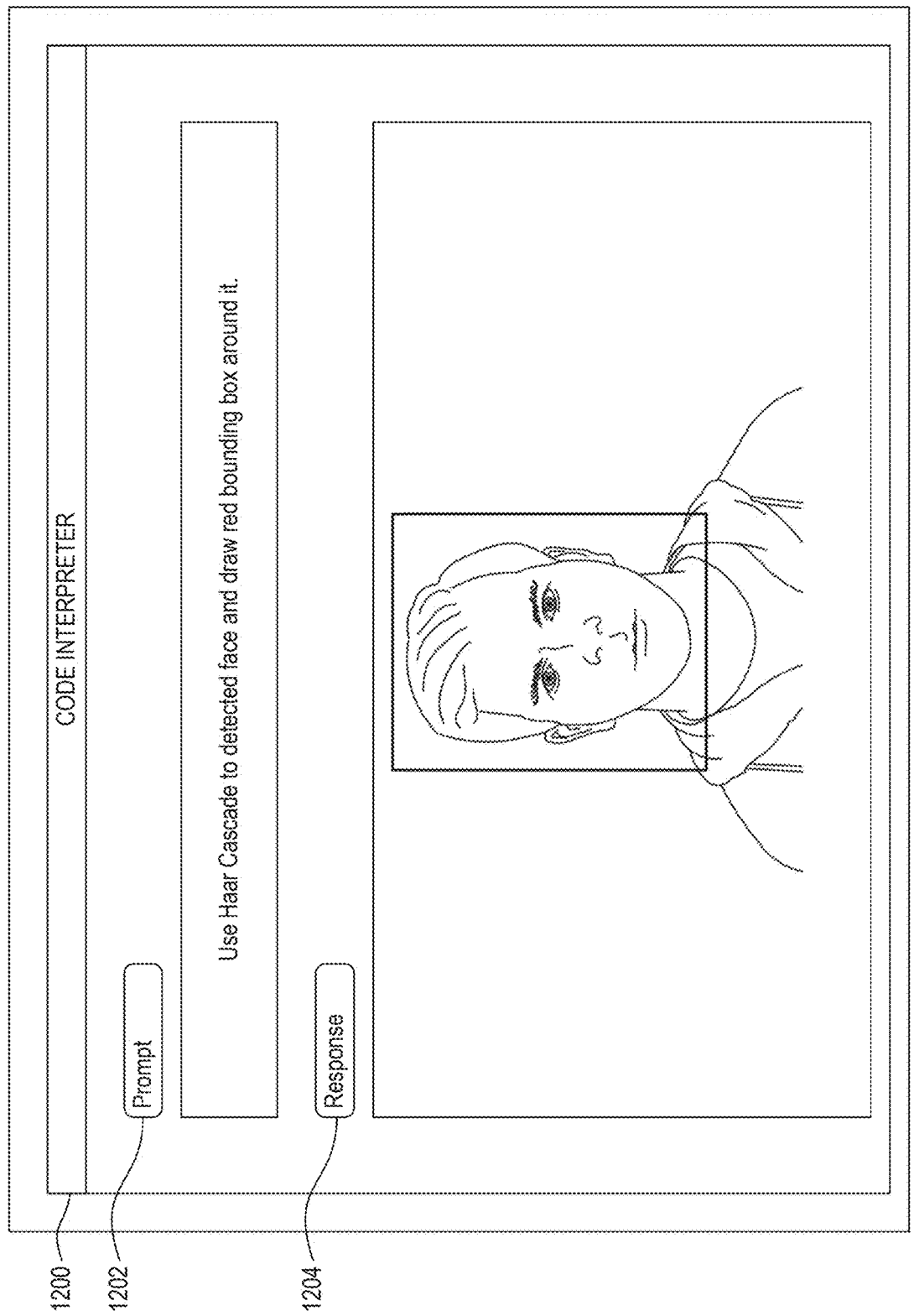
FIG. 12 illustrates a third exemplary user interface or an exemplary output of the code interpreter in accordance with some embodiments of the present disclosure.

FIG. 12 illustrates a third exemplary user interface or an exemplary output of the code interpreter in accordance with some embodiments of the present disclosure. FIG. 12 shows an exemplary code interpreter 1200 that includes a prompt 1202 and a response 1204. In this embodiment, the user may utilize prompt 1202 to input text prompt 1202 request that reads: "Use Haar Cascade to detect the face and draw a red bounding box around it." In this embodiment, the user may also input an image file along with text prompt 1202. Code interpreter 1200 and/or a machine learning model may determine that text prompt 1202 requires the implementing of code. Thereafter, a machine learning model may generate code to call a tool that uses Haar Cascade image detection, provide the tool the inputted image, and instruct the tool to detect the face as required by the user prompt. Code interpreter 1200 may execute the code and thereby cause the facial detection to be performed, as seen in FIG. 12. As further seen in FIG. 12, response 1204 includes displaying, through the user interface, the outputted image file with a red bounding box around the detected face.

Figure 13:
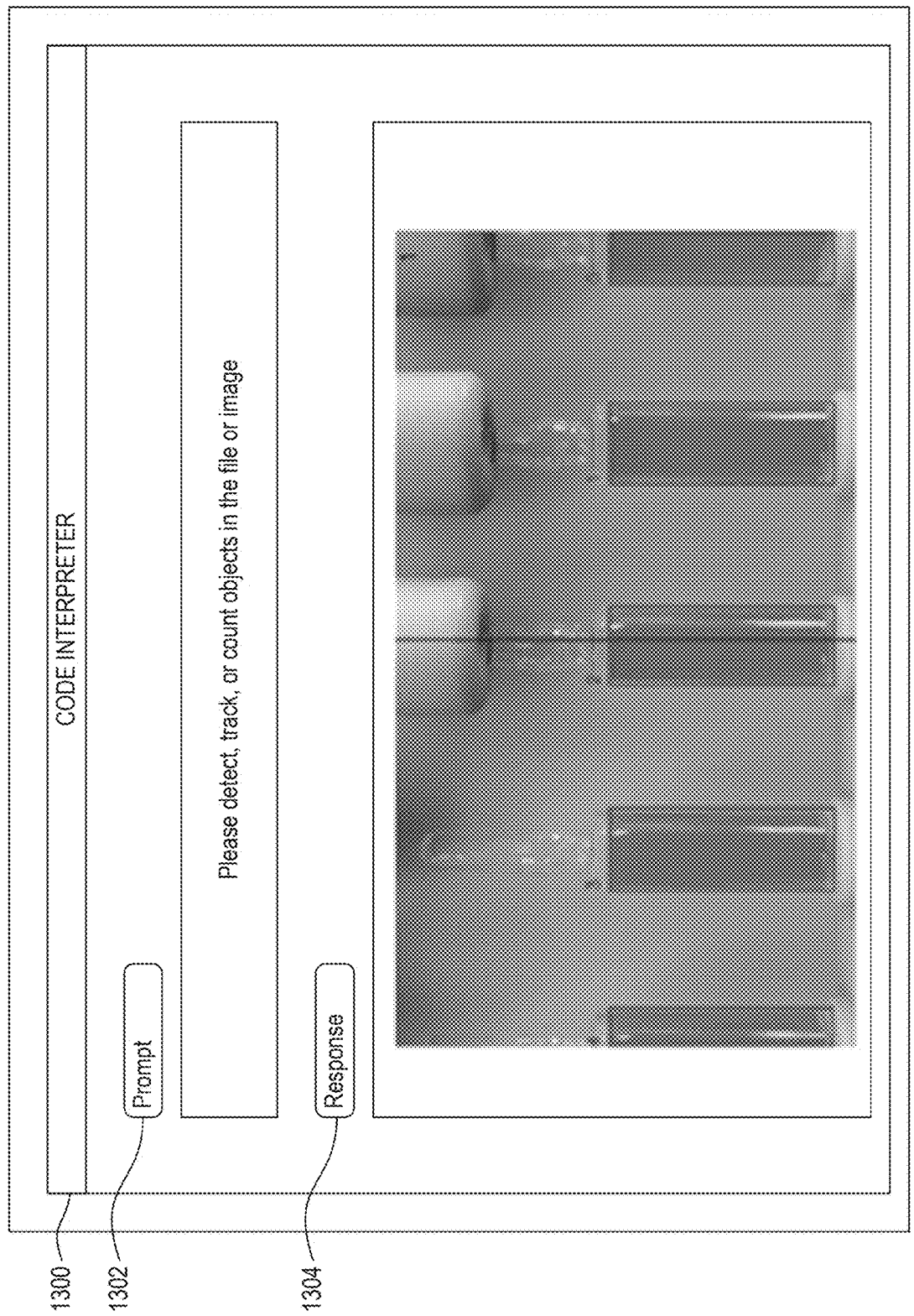
FIG. 13 illustrates a fourth exemplary user interface or an exemplary output of the code interpreter in accordance with some embodiments of the present disclosure.

FIG. 13 illustrates a fourth exemplary user interface or an exemplary output of the code interpreter in accordance with some embodiments of the present disclosure. FIG. 13 shows an exemplary code interpreter 1300 that includes a prompt 1302 and a response 1304. In this embodiment, the user may utilize prompt 1302 to input a text prompt request that requests the detection, tracking, and counting of objects in the data or data file. As seen in prompt 1302, the user may input "please detect, track, or count objects in the file or image." In this embodiment, the user may also input a data file or an image file along with aforementioned text prompt 1302. Code interpreter 1300 and/or a machine learning model determines that text prompt 1302 requires implementing code. Therefore, a machine learning model generates computer code or script based on inputted prompt. Code interpreter 1600 executes the computer code or script, wherein the execution of the computer code script includes performing the detection, tracking, and counting of objects in the data, as seen in FIG. 13. As further seen in FIG. 13, response 1304 includes displaying, through the user interface, the requested output.

Figure 14:
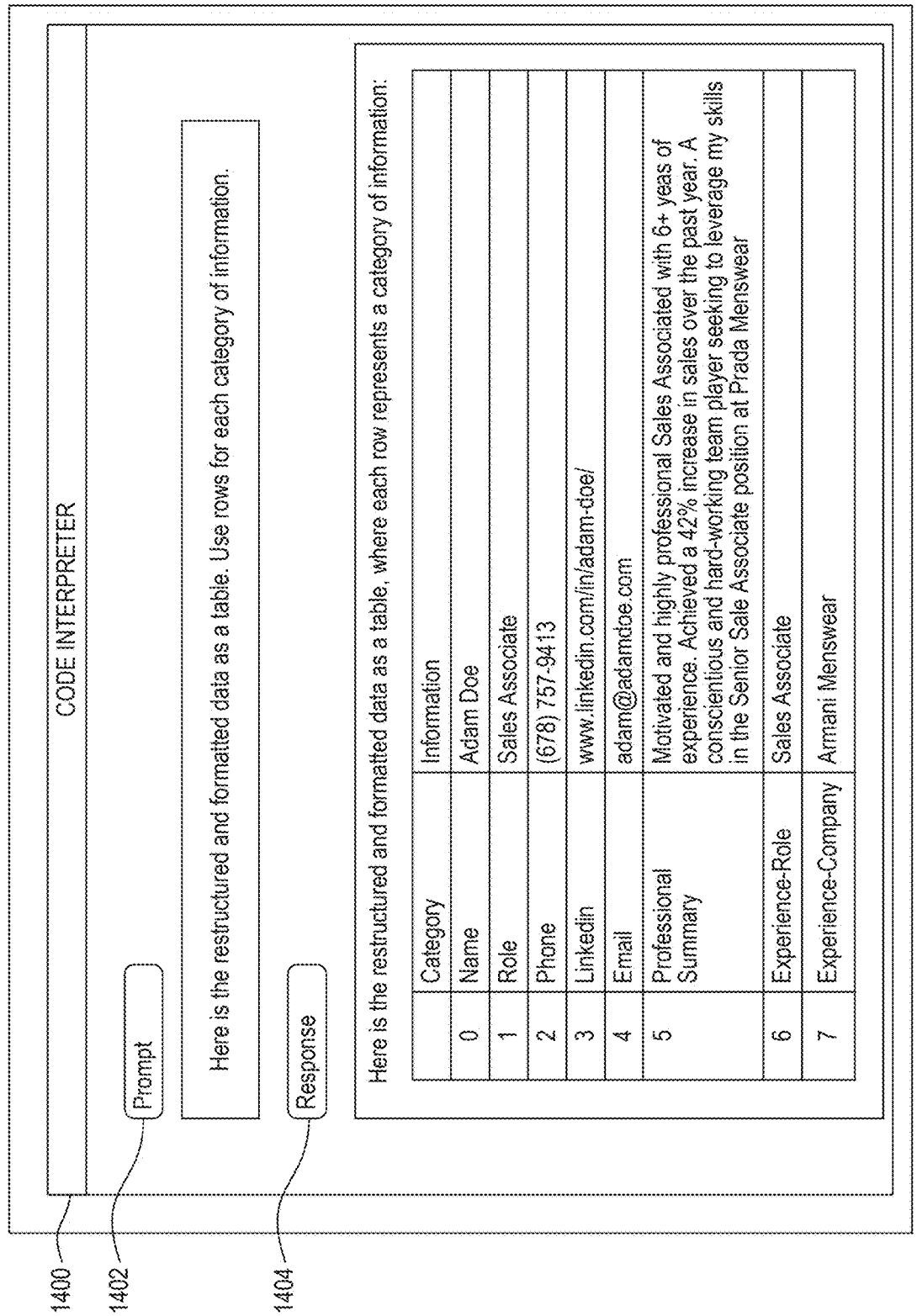
FIG. 14 illustrates a fifth exemplary user interface or an exemplary output of the code interpreter in accordance with some embodiments of the present disclosure.

FIG. 14 illustrates a fifth exemplary user interface or an exemplary output of the code interpreter in accordance with some embodiments of the present disclosure. FIG. 14 shows an exemplary code interpreter 1400 that includes a prompt 1402 and a response 1404. In this embodiment, the user may utilize prompt 1402 to input text prompt 1402 request that reads: "Here is the restructured and formatted data as a table. Use rows for each category of information." In this embodiment, the user may also input a data file comprising a table along with aforementioned text prompt 1402. Code interpreter 1400 and/or a machine learning model determines that text prompt 1402 requires the implementing of code. Therefore, a machine learning model generates computer code or script based on inputted prompt. Code interpreter 1400 executes the computer code or script, wherein the execution of the computer code script includes performing complex data transformation via restructuring and formatting the data as a table. As further seen in FIG. 14, response 1404 includes displaying, through the user interface, the requested output.

Figure 15:
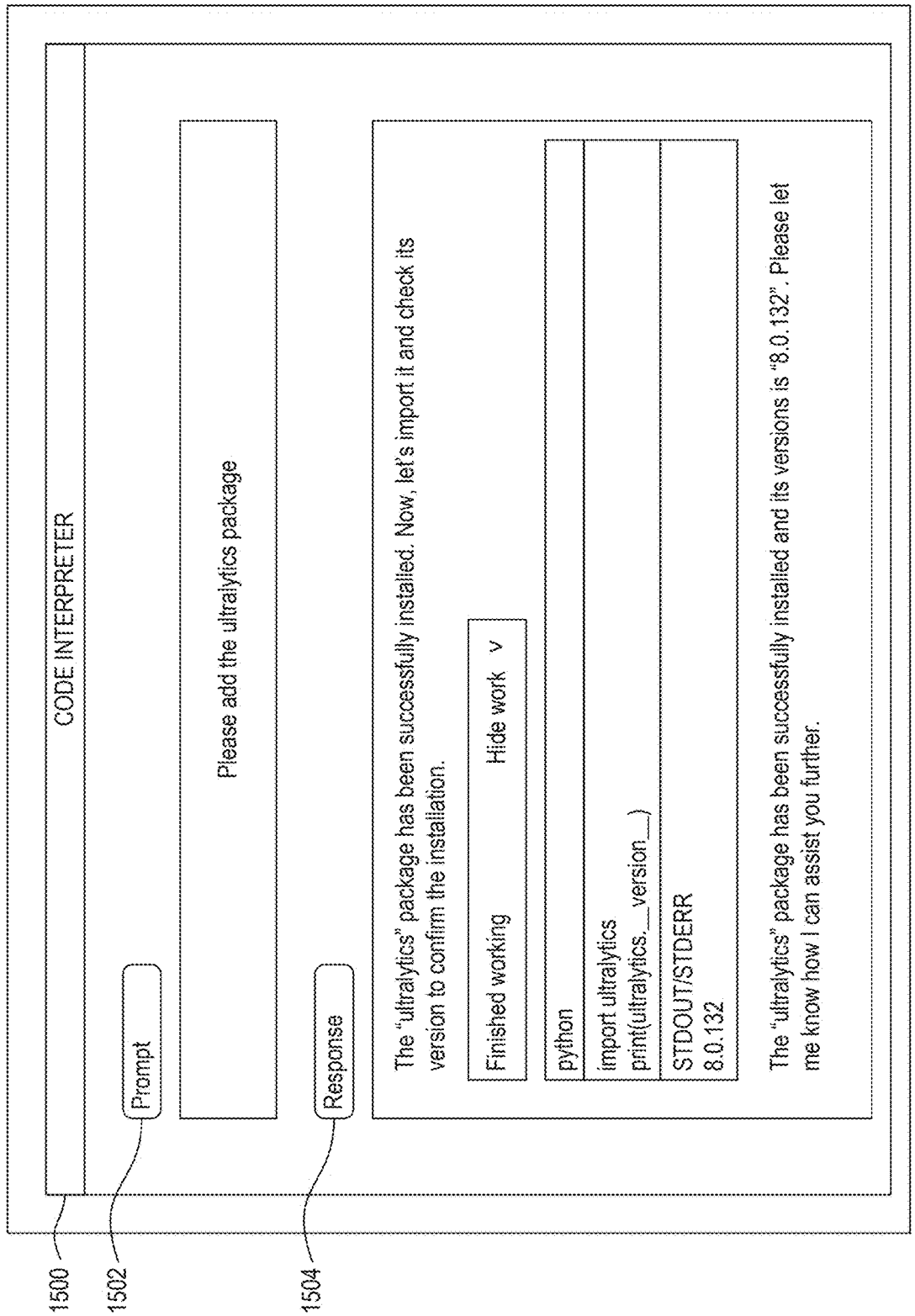
FIG. 15 illustrates a sixth exemplary user interface or an exemplary output of the code interpreter in accordance with some embodiments of the present disclosure.

FIG. 15 illustrates a sixth exemplary user interface or an exemplary output of the code interpreter in accordance with some embodiments of the present disclosure. FIG. 15 shows an exemplary code interpreter 1500 that includes a prompt 1502 and a response 1504. In this embodiment, the user may utilize prompt 1502 to input a text prompt request that requests the installation of expanded coding libraries or new coding packages. As seen in prompt 1502, the user may input "please add the ultralytics package" and may upload the package to be added or specify a location for package retrieval. Code interpreter 1500 and/or a machine learning model determines that text prompt 1502 requires the implementing of code. Therefore, a machine learning model generates computer code or script based on inputted prompt. Code interpreter 1500 executes the computer code or script, wherein the execution of the computer code script includes performing the installation of a new coding package (e.g., into a local memory of a system associated with code interpreter 1500), as seen in FIG. 15. As further seen in FIG. 15, response 1504 includes displaying, through the user interface, the requested output.

Figure 16:
FIG. 16 illustrates a seventh exemplary user interface or an exemplary output of the code interpreter in accordance with some embodiments of the present disclosure.

FIG. 16 illustrates a seventh exemplary user interface or an exemplary output of the code interpreter in accordance with some embodiments of the present disclosure. FIG. 16 shows an exemplary code interpreter 1600 that includes a prompt 1602 and a response 1604. In this embodiment, the user may utilize prompt 1602 to input a text prompt request that requests the detection, tracking, and counting of objects in the data or data file. As seen in prompt 1602, the user may input "please detect, track, or count objects in the file or image." In this embodiment, the user may also input a data file or an image file along with aforementioned text prompt 1602. Code interpreter 1600 and/or a machine learning model determines that text prompt 1602 requires the implementing of code. Therefore, a machine learning model generates computer code or script based on inputted text prompt 1602. Code interpreter 1600 executes the computer code or script, wherein the execution of the computer code script includes performing the detection, tracking, and counting of objects in the data, as seen in FIG. 16. As further seen in FIG. 16, response 1604 includes displaying, through the user interface, the requested output.

Figure 17:
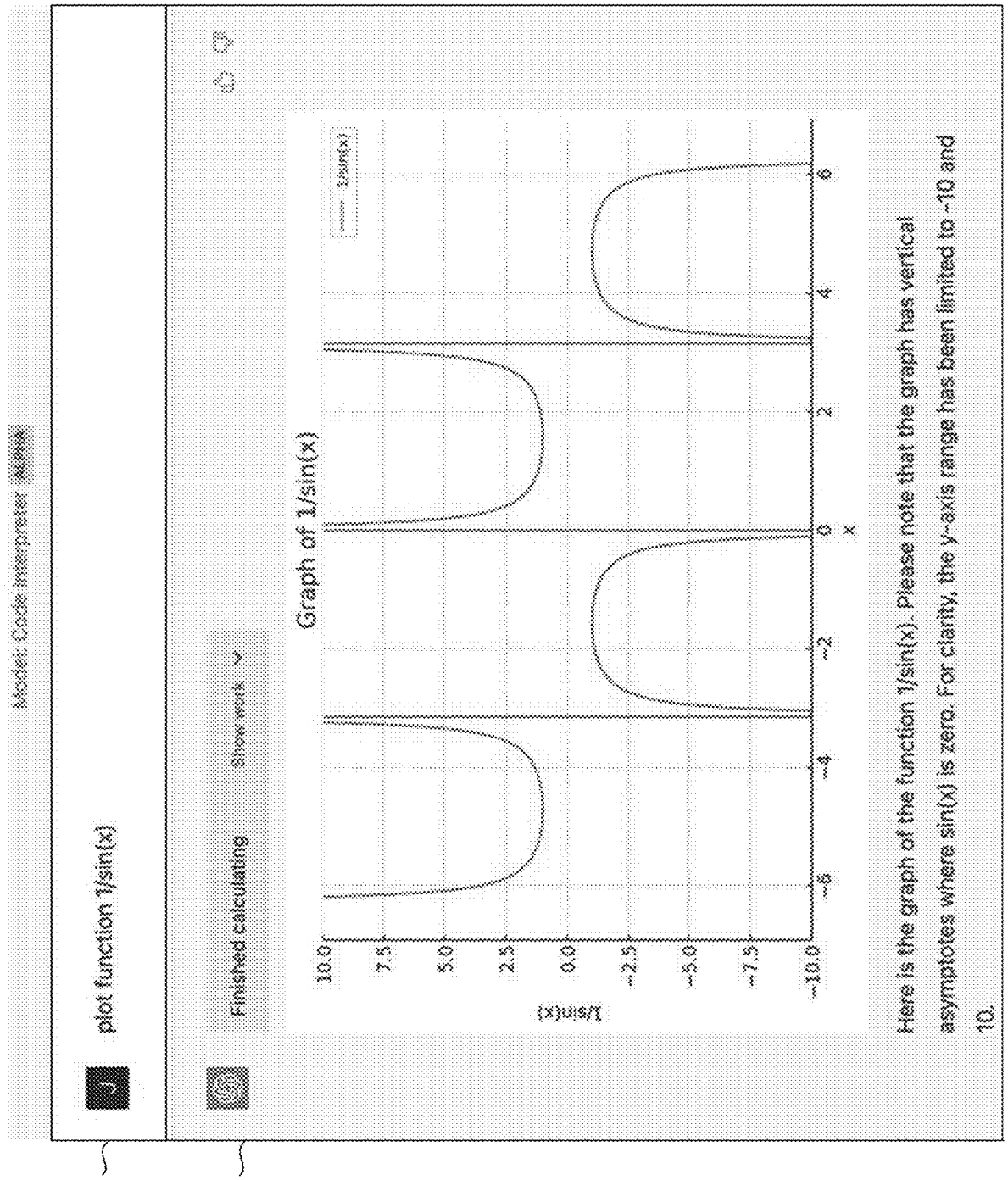
FIG. 17 illustrates an eighth exemplary user interface or an exemplary output of the code interpreter in accordance with some embodiments of the present disclosure.

FIG. 17 illustrates an eighth exemplary user interface or an exemplary output of the code interpreter in accordance with some embodiments of the present disclosure. FIG. 17 shows an exemplary code interpreter 1700 that includes a prompt 1702 and a response 1704. In this embodiment, the user may utilize prompt 1702 to input a text prompt request that reads: "plot function 1/sin(x)." Here, the user requests a data visualization of data in a data file. In this embodiment, the user may also input a data file along with aforementioned text prompt 1702. Code interpreter 1700 and/or a machine learning model determines that text prompt 1702 requires the implementing of code. Therefore, a machine learning model generates computer code or script based on inputted prompt. Code interpreter 1700 executes the computer code or script, wherein the execution of the computer code script includes performing data visualization of the data in the data file. As further seen in FIG. 17, response 1704 includes displaying, through the user interface, the requested output.

Figure 18:
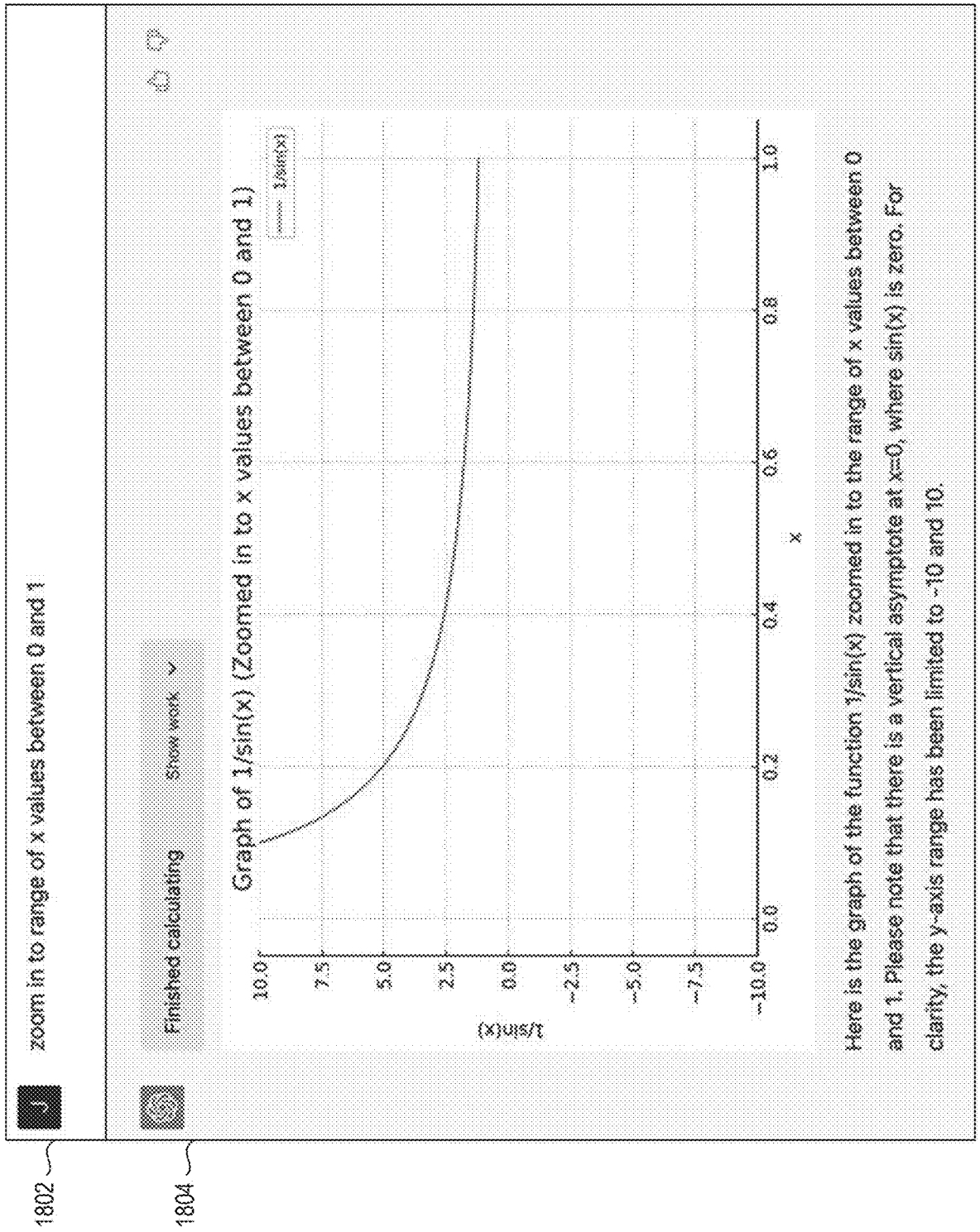
FIG. 18 illustrates a ninth exemplary user interface or an exemplary output of the code interpreter in accordance with some embodiments of the present disclosure.

FIG. 18 illustrates a ninth exemplary user interface or an exemplary output of the code interpreter in accordance with some embodiments of the present disclosure. FIG. 18 shows an exemplary code interpreter 1800 that includes a prompt 1802 and a response 1804. In this embodiment, the user may utilize prompt 1802 to input a text prompt request that reads: "zoom in to range of x values between 0 and 1." Here, the user requests a data visualization of data in a data file. In this embodiment, the user may also input a data file along with aforementioned text prompt 1802. Code interpreter 1800 and/or a machine learning model determines that text prompt 1802 requires the implementing of code. Therefore, a machine learning model generates computer code or script based on inputted prompt. Code interpreter 1800 executes the computer code or script, wherein the execution of the computer code script includes performing data visualization of the data in the data file. As further seen in FIG. 18, response 1804 includes displaying, through the user interface, the requested output.

Figure 19:
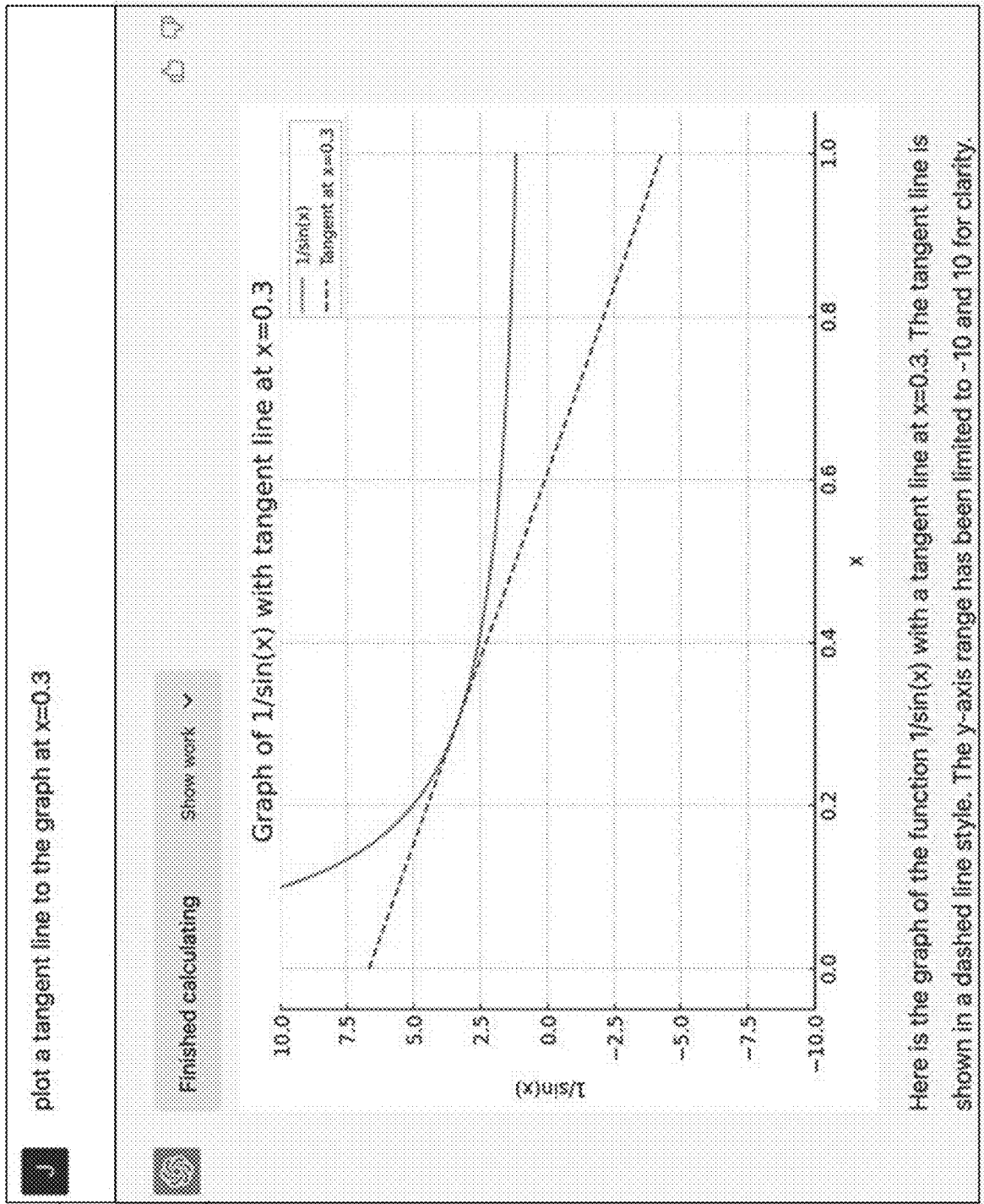
FIG. 19 illustrates a tenth exemplary user interface or an exemplary output of the code interpreter in accordance with some embodiments of the present disclosure.

FIG. 19 illustrates a tenth exemplary user interface or an exemplary output of the code interpreter in accordance with some embodiments of the present disclosure. FIG. 19 shows an exemplary code interpreter 1900 that includes a prompt 1902 and a response 1904. In this embodiment, the user may utilize prompt 1902 to input a text prompt request that reads: "plot a tangent line to the graph at x=0.3." Here, the user requests a data visualization of data in a data file. In this embodiment, the user may also input a data file along with aforementioned text prompt 1902. Code interpreter 1900 and/or a machine learning model determines that text prompt 1902 requires the implementing of code. Therefore, a machine learning model generates computer code or script based on inputted prompt. Code interpreter 1900 executes the computer code or script, wherein the execution of the computer code script includes performing data visualization of the data in the data file. As further seen in FIG. 19, response 1904 includes displaying, through the user interface, the requested output.

Figure 20:
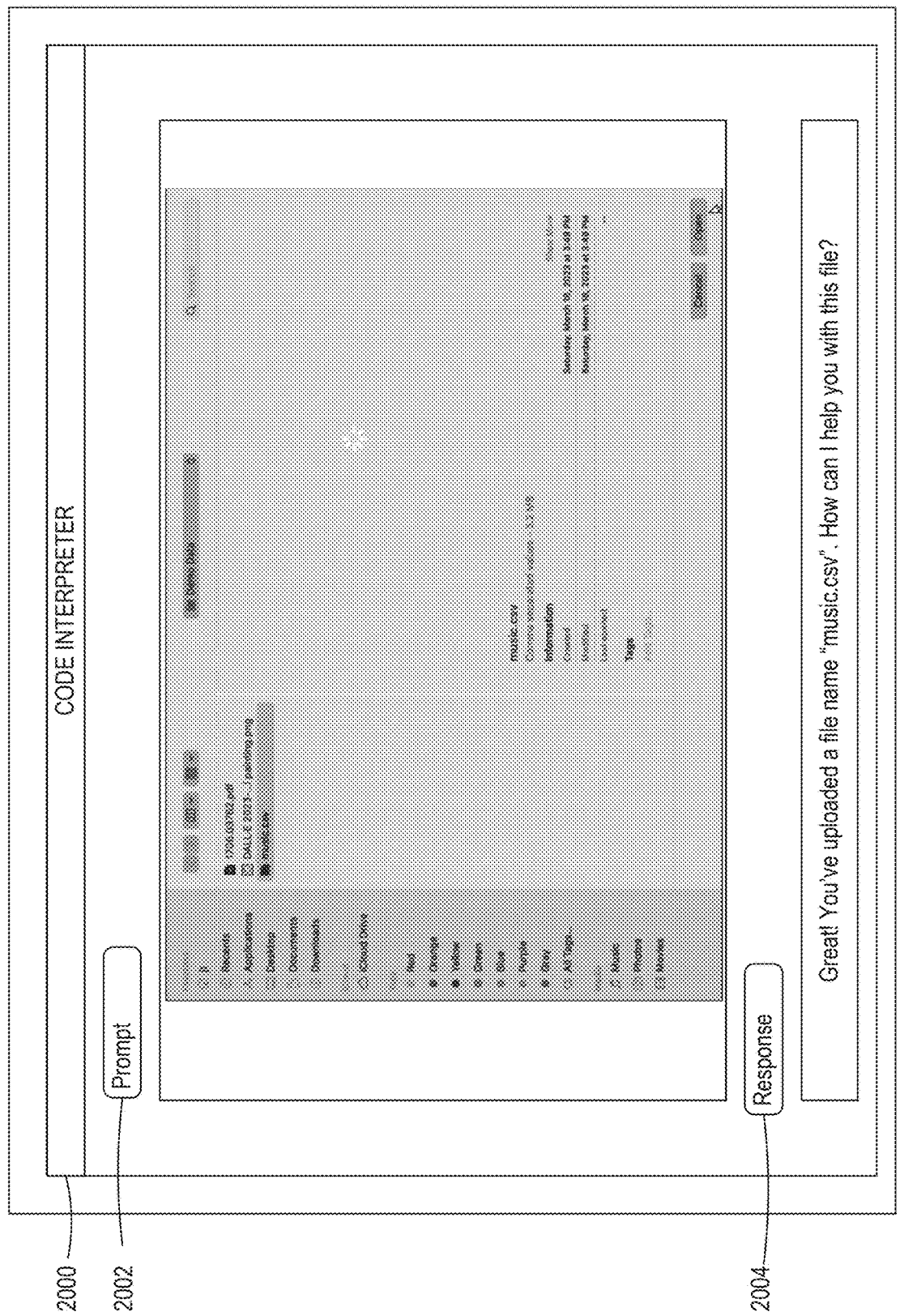
FIG. 20 illustrates an eleventh exemplary user interface or an exemplary output of the code interpreter in accordance with some embodiments of the present disclosure.

FIG. 20 illustrates an eleventh exemplary user interface or an exemplary output of the code interpreter in accordance with some embodiments of the present disclosure. FIG. 20 shows an exemplary code interpreter 2000 that includes a prompt 2002 and a response 2004. In this embodiment, the user may utilize prompt 2002 to input an uploaded file. Code interpreter 2000 and/or a machine learning model determines that prompt 2002 requires the implementing of code. Therefore, a machine learning model generates computer code or script based on inputted prompt. Code interpreter executes the computer code or script, wherein the execution of the computer code script includes performing a file upload. As further seen in FIG. 20, response 2004 includes displaying, through the user interface, the requested output.

Figure 21:
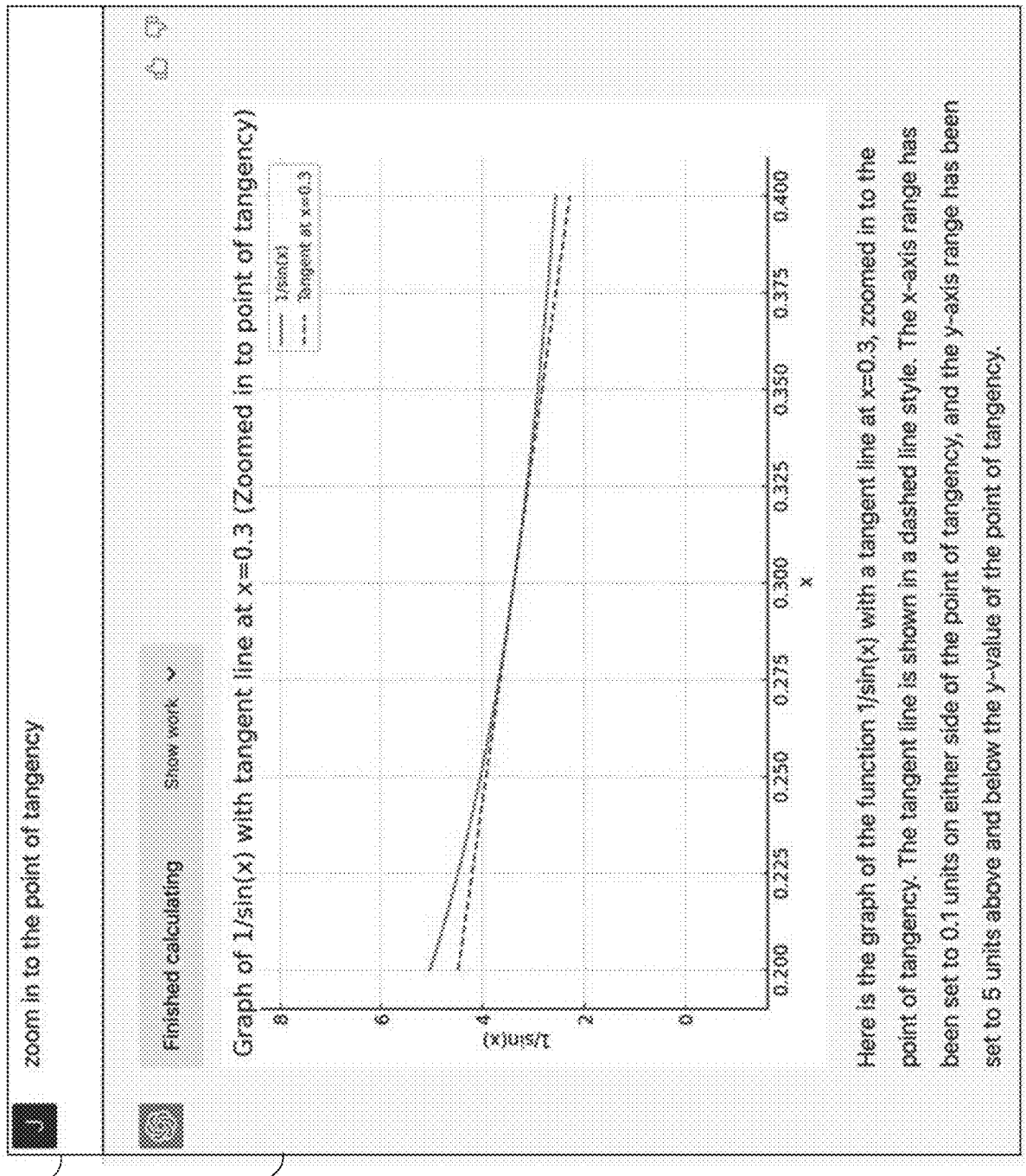
FIG. 21 illustrates a twelfth exemplary user interface or an exemplary output of the code interpreter in accordance with some embodiments of the present disclosure.

FIG. 21 illustrates a twelfth exemplary user interface or an exemplary output of the code interpreter in accordance with some embodiments of the present disclosure. FIG. 21 shows an exemplary code interpreter 2100 that includes a prompt 2102 and a response 2104. In this embodiment, the user may utilize prompt 2102 to input a text prompt request that reads: "zoom in to the point of tangency." Here, the user requests a data visualization of data in a data file. In this embodiment, the user may also input a data file along with aforementioned text prompt 2102. Code interpreter 2100 and/or a machine learning model determines that text prompt 2102 requires the implementing of code. Therefore, a machine learning model generates computer code or script based on inputted prompt. Code interpreter 2100 executes the computer code or script, wherein the execution of the computer code script includes performing data visualization of the data in the data file. As further seen in FIG. 21, response 2404 includes displaying, through the user interface, the requested output.

FIG. 22 illustrates a thirteenth exemplary user interface or an exemplary output of the code interpreter in accordance with some embodiments of the present disclosure. FIG. 22 shows an exemplary code interpreter 2200 that includes a prompt 2202 and a response 2204. In this embodiment, the user may utilize prompt 2202 to input a text prompt 2202 request that reads: "what are the columns of this dataset." In this embodiment, the user may also input a data file comprising a table along with aforementioned text prompt 2202. Code interpreter 2200 and/or a machine learning model determines that text prompt 2202 requires the implementing of code. Therefore, a machine learning model generates computer code or script based on inputted prompt. Code interpreter 2200 executes the computer code or script, wherein the execution of the computer code script includes performing a data analysis or a statistical analysis of the data via the naming and numbering of columns in the dataset. As further seen in FIG. 22, response 2204 includes displaying, through the user interface, the requested output.

Figure 23:
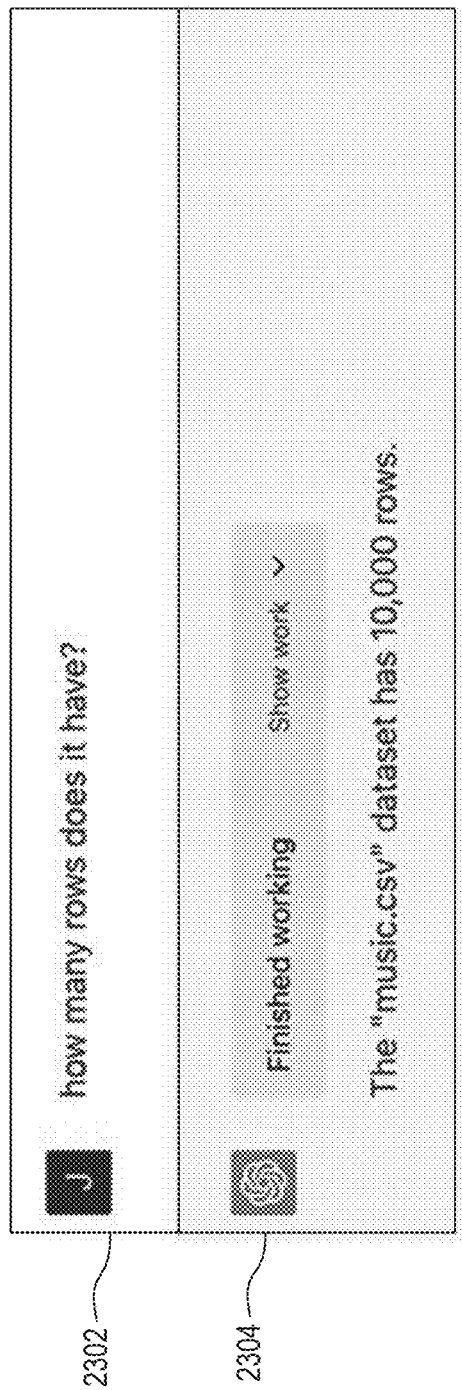
FIG. 23 illustrates a fourteenth exemplary user interface or an exemplary output of the code interpreter in accordance with some embodiments of the present disclosure.

FIG. 23 illustrates a fourteenth exemplary user interface or an exemplary output of the code interpreter in accordance with some embodiments of the present disclosure. FIG. 23 shows an exemplary code interpreter 2300 that includes a prompt 2302 and a response 2304. In this embodiment, the user may utilize prompt 2302 to input a text prompt 2302 request that reads: "how many rows does it have?" In this embodiment, the user may also input a data file comprising a table along with aforementioned text prompt 2302. Code interpreter 2300 and/or a machine learning model determines that text prompt 2302 requires the implementing of code. Therefore, a machine learning model generates computer code or script based on inputted prompt. Code interpreter 2300 executes the computer code or script, wherein the execution of the computer code script includes performing a data analysis or a statistical analysis of the data via the numbering of rows in the dataset. As further seen in FIG. 23, response 2304 includes displaying, through the user interface, the requested output.

Figure 24:
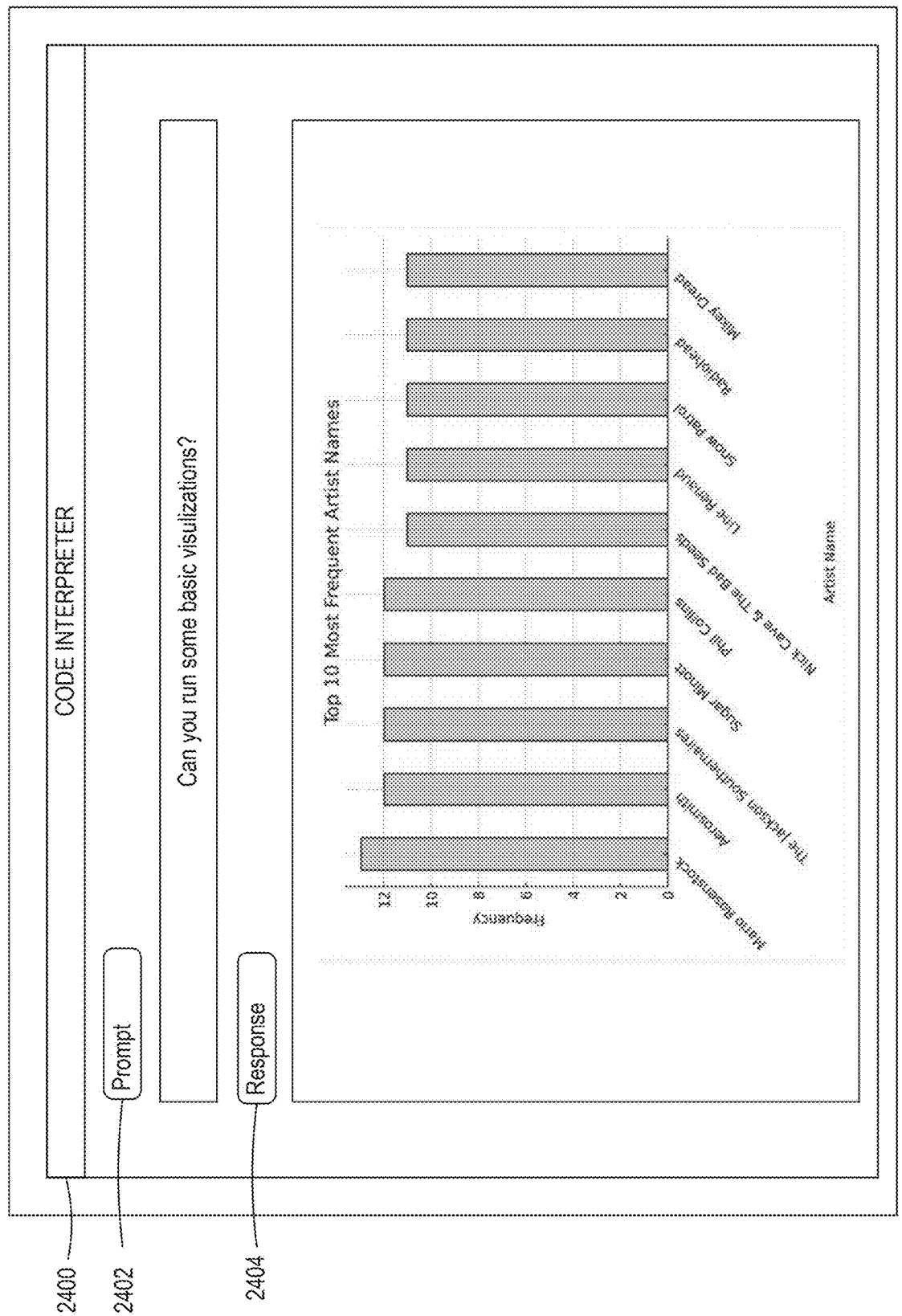
FIG. 24 illustrates a fifteenth exemplary user interface or an exemplary output of the code interpreter in accordance with some embodiments of the present disclosure.

FIG. 24 illustrates a fifteenth exemplary user interface or an exemplary output of the code interpreter in accordance with some embodiments of the present disclosure. FIG. 24 shows an exemplary code interpreter 2400 that includes a prompt 2402 and a response 2404. In this embodiment, the user may utilize prompt 2402 to input a text prompt request that reads: "can you run some basic visualizations?" Here, the user requests a data visualization of data in a data file. In this embodiment, the user may also input a data file along with aforementioned text prompt 2402. Code interpreter 2400 and/or a machine learning model determines that text prompt 2402 requires the implementing of code. Therefore, code interpreter 2400 generates and executes a computer code script based on inputted text prompt 2402, wherein the execution of the computer code script includes performing data visualization of the data in the data file. As further seen in FIG. 24, response 2404 includes displaying, through the user interface, the requested output.

Figure 25:
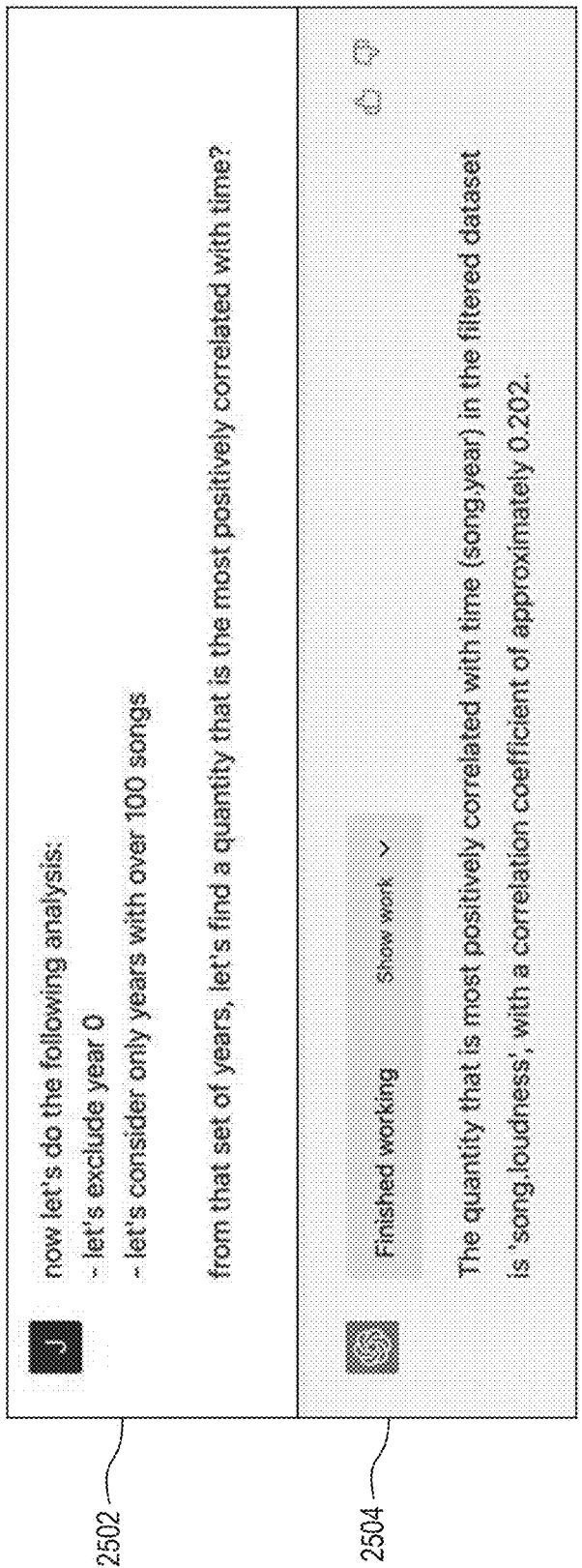
FIG. 25 illustrates a sixteenth exemplary user interface or an exemplary output of the code interpreter in accordance with some embodiments of the present disclosure.

FIG. 25 illustrates a sixteenth exemplary user interface or an exemplary output of the code interpreter in accordance with some embodiments of the present disclosure. FIG. 25 shows an exemplary code interpreter 2500 that includes a prompt 2502 and a response 2504. In this embodiment, the user may utilize prompt 2502 to input text prompt 2502 request that reads as seen in FIG. 25. In this embodiment, the user may also input a data file along with aforementioned text prompt 2502. Code interpreter 2500 and/or a machine learning model determines that text prompt 2502 requires the implementing of code. Therefore, a machine learning model generates computer code or script based on inputted prompt. Code interpreter 2500 executes the computer code or script, wherein the execution of the computer code script includes performing a data analysis or a statistical analysis of the data. As further seen in FIG. 25, response 2504 includes displaying, through the user interface, the requested output.

Figure 26:
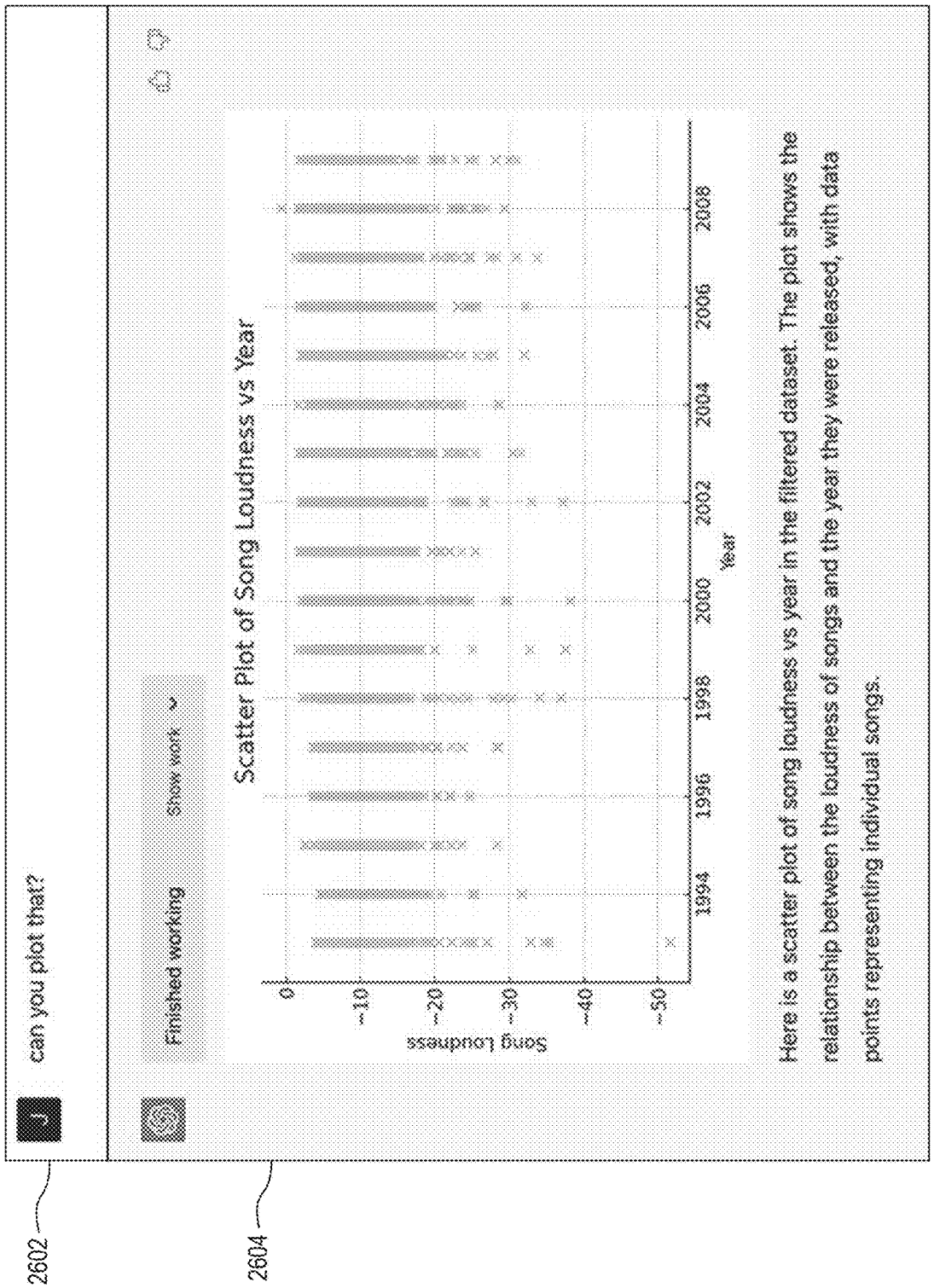
FIG. 26 illustrates a seventeenth exemplary user interface or an exemplary output of the code interpreter in accordance with some embodiments of the present disclosure.

FIG. 26 illustrates a seventeenth exemplary user interface or an exemplary output of the code interpreter in accordance with some embodiments of the present disclosure. FIG. 26 shows an exemplary code interpreter 2600 that includes a prompt 2602 and a response 2604. In this embodiment, the user may utilize prompt 2602 to input a text prompt request that reads: "can you plot that?" Here, the user requests a data visualization of data in a data file. In this embodiment, the user may also input a data file along with aforementioned text prompt 2602. Code interpreter 2600 and/or a machine learning model determines that text prompt 2602 requires the implementing of code. Therefore, a machine learning model generates computer code or script based on inputted prompt. Code interpreter executes the computer code or script, wherein the execution of the computer code script includes performing data visualization of the data in the data file. As further seen in FIG. 26, response 2604 includes displaying, through the user interface, the requested output.

Figure 27:
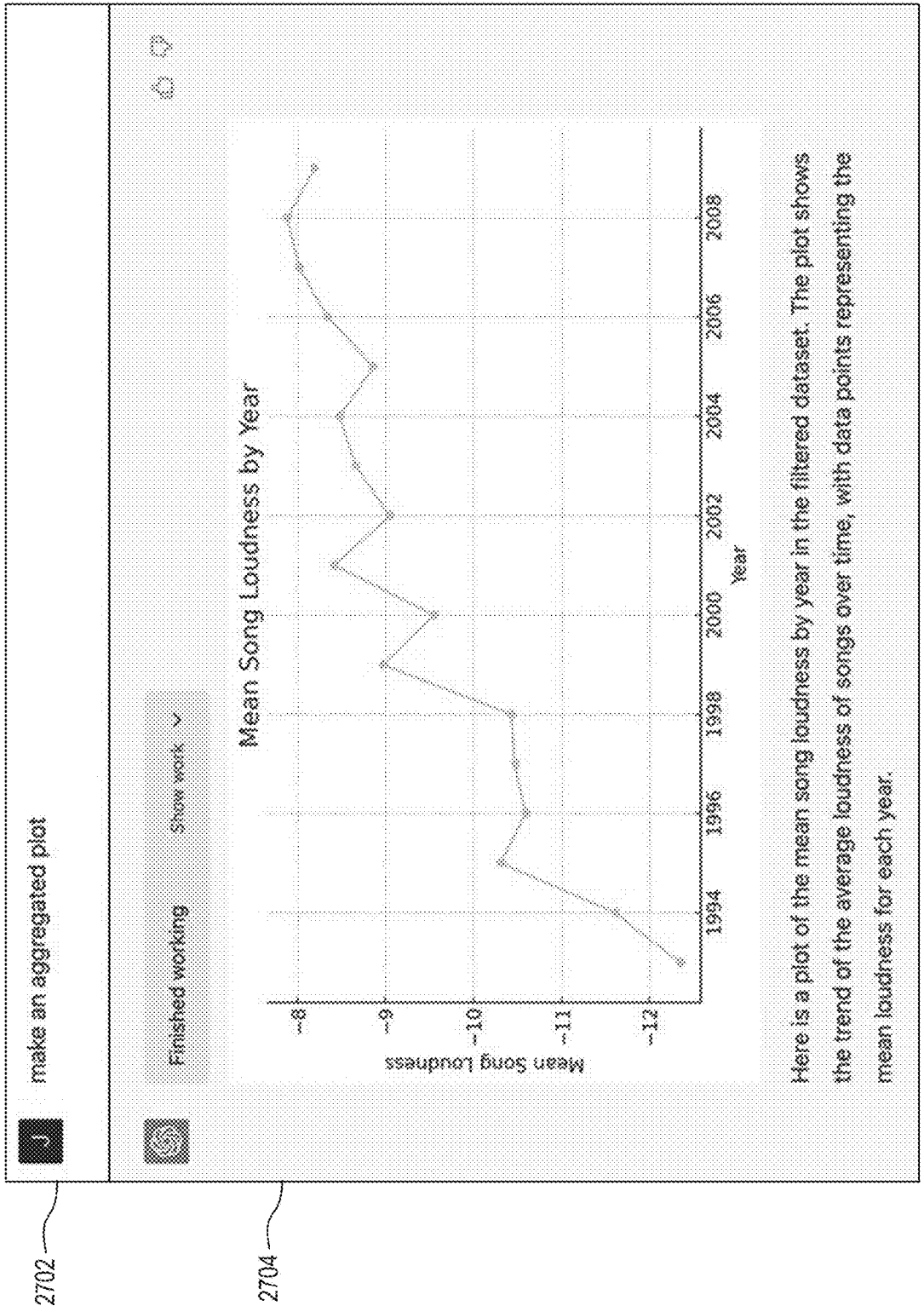
FIG. 27 illustrates an eighteenth exemplary user interface or an exemplary output of the code interpreter in accordance with some embodiments of the present disclosure.

FIG. 27 illustrates an eighteenth exemplary user interface or an exemplary output of the code interpreter in accordance with some embodiments of the present disclosure. FIG. 27 shows an exemplary code interpreter 2700 that includes a prompt 2702 and a response 2704. In this embodiment, the user may utilize prompt 2702 to input a text prompt request that reads: "make an aggregated plot." Here, the user requests a data visualization of data in a data file. In this embodiment, the user may also input a data file along with aforementioned text prompt 2702. Code interpreter 2700 and/or a machine learning model determines that text prompt 2702 requires the implementing of code. Therefore, a machine learning model generates computer code or script based on inputted prompt. Code interpreter 2700 executes the computer code or script, wherein the execution of the computer code script includes performing data visualization of the data in the data file. As further seen in FIG. 27, response 2704 includes displaying, through the user interface, the requested output.

Figure 28:
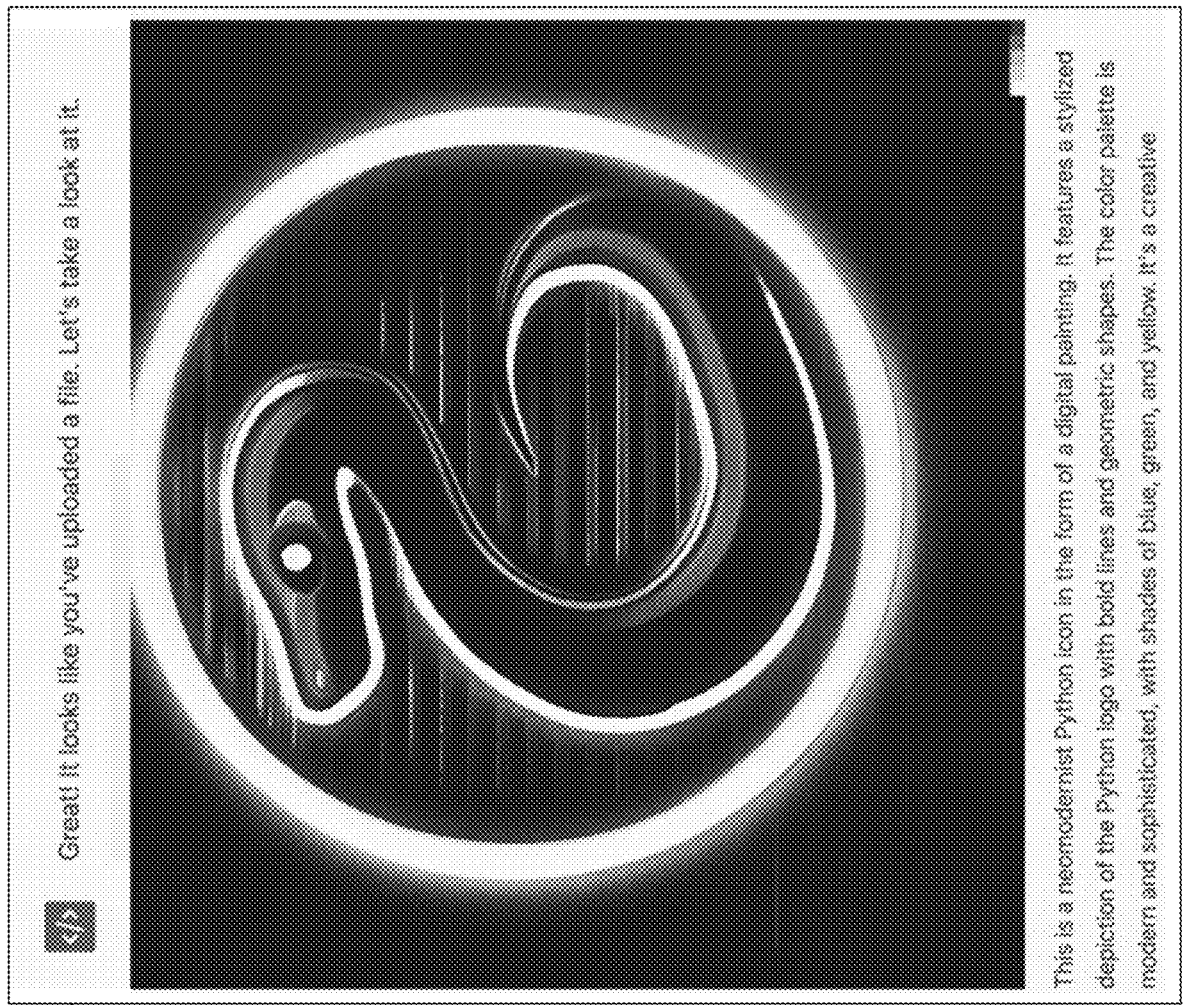
FIG. 28 illustrates a nineteenth exemplary user interface or an exemplary output of the code interpreter in accordance with some embodiments of the present disclosure.

FIG. 28 illustrates a nineteenth exemplary user interface or an exemplary output of the code interpreter in accordance with some embodiments of the present disclosure. FIG. 28 shows an exemplary code interpreter 2800 that includes a prompt 2802 and a response 2804. In this embodiment, the user may utilize prompt 2802 to input an uploaded image file. Code interpreter 2800 and/or a machine learning model determines that prompt 2802 requires the implementing of code. Therefore, a machine learning model generates computer code or script based on inputted prompt. Code interpreter 2800 executes the computer code or script, wherein the execution of the computer code script includes performing a file upload. As further seen in FIG. 28, response 2804 includes displaying, through the user interface, the requested output of the colored image file, along with a description of the uploaded colored image file.

Figure 29:
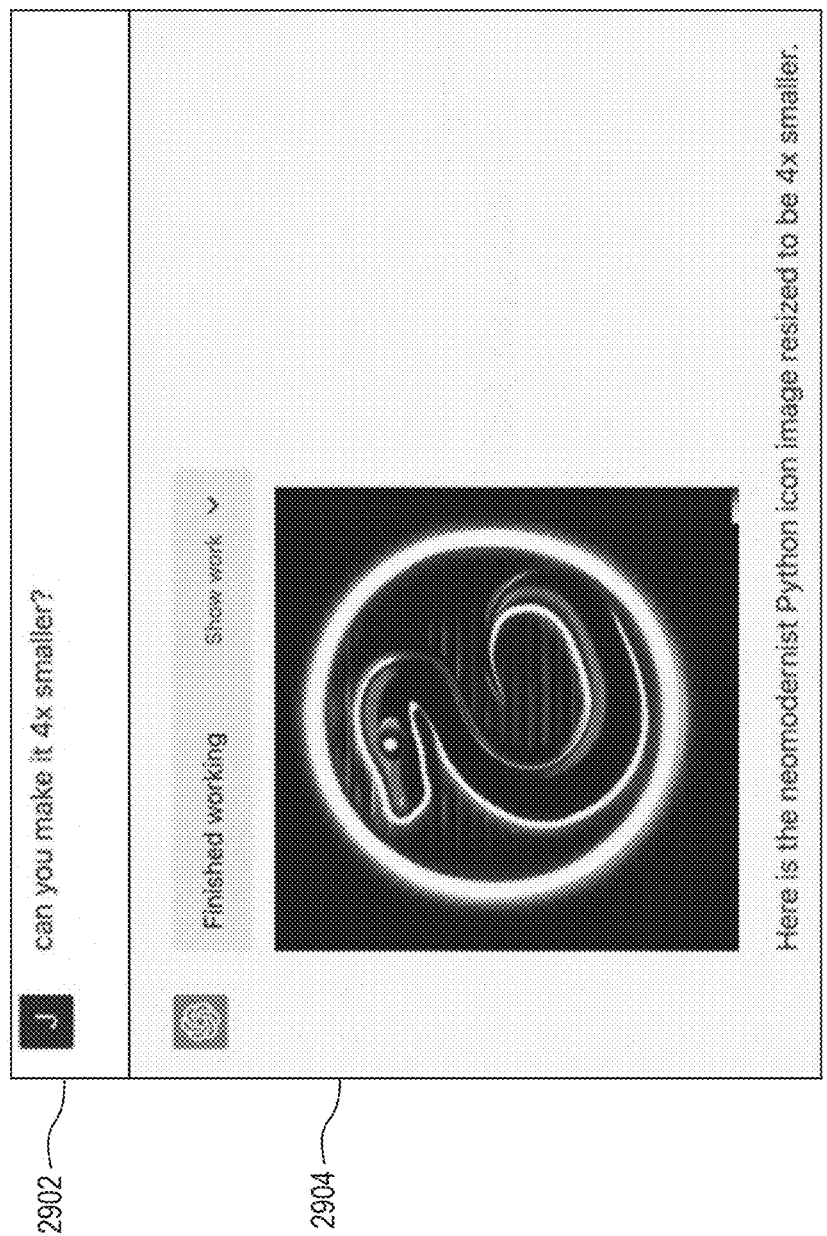
FIG. 29 illustrates a twentieth exemplary user interface or an exemplary output of the code interpreter in accordance with some embodiments of the present disclosure.

FIG. 29 illustrates a twentieth exemplary user interface or an exemplary output of the code interpreter in accordance with some embodiments of the present disclosure. FIG. 29 shows an exemplary code interpreter 2900 that includes a prompt 2902 and a response 2904. In this embodiment, the user may utilize prompt 2902 to input a text prompt 2902 request that reads: "can you make it 4× smaller?" In this embodiment, the user may be referring to the inputted image file in the prompt 2802 of FIG. 28. Code interpreter 2900 and/or a machine learning model determines that text prompt 2902 requires the implementing of code. Therefore, a machine learning model generates computer code or script based on inputted prompt. Code interpreter executes the computer code or script, wherein the execution of the computer code script includes performing complex data transformation or image transformation of the inputted image file in prompt 2802 of FIG. 28. As further seen in FIG. 29, response 2904 includes displaying, through the user interface, the requested output of the colored image file, along with a description of the colored image file.

Figure 30:
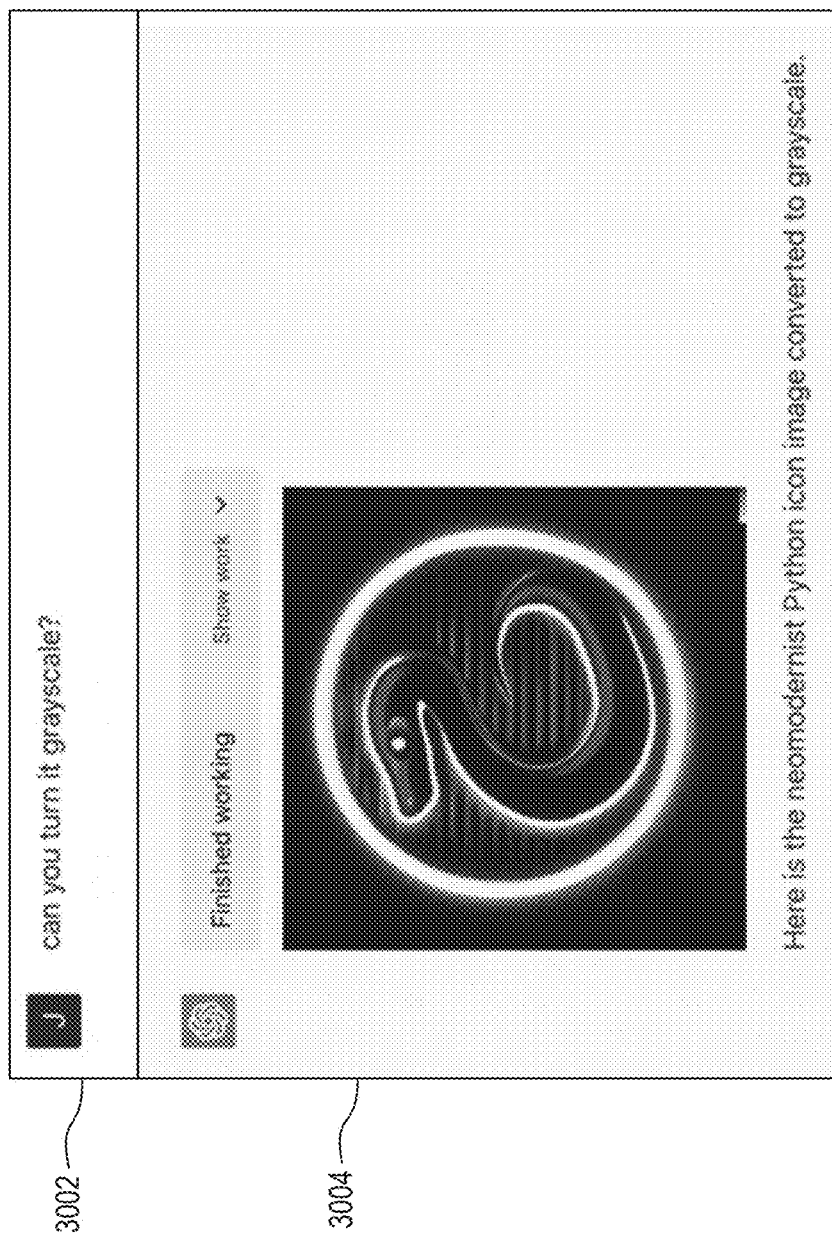
FIG. 30 illustrates a twenty-first exemplary user interface or an exemplary output of the code interpreter in accordance with some embodiments of the present disclosure.

FIG. 30 illustrates a twenty-first exemplary user interface or an exemplary output of the code interpreter in accordance with some embodiments of the present disclosure. FIG. 30 shows an exemplary code interpreter 3000 that includes a prompt 3002 and a response 3004. In this embodiment, the user may utilize prompt 3002 to input a text prompt 3002 request that reads: "can you turn it grayscale?" In this embodiment, the user may be referring to inputted image file in prompt 2802 of FIG. 28. Code interpreter 3000 and/or a machine learning model determines that text prompt 3002 requires the implementing of code. Therefore, a machine learning model generates computer code or script based on inputted prompt. Code interpreter 3000 executes the computer code or script, wherein the execution of the computer code script includes performing complex data transformation or image transformation of the inputted image file in prompt 2802 of FIG. 28. As further seen in FIG. 30, response 3004 includes displaying, through the user interface, the requested output of the colored image file, along with a description of the colored image file.

Figure 31:
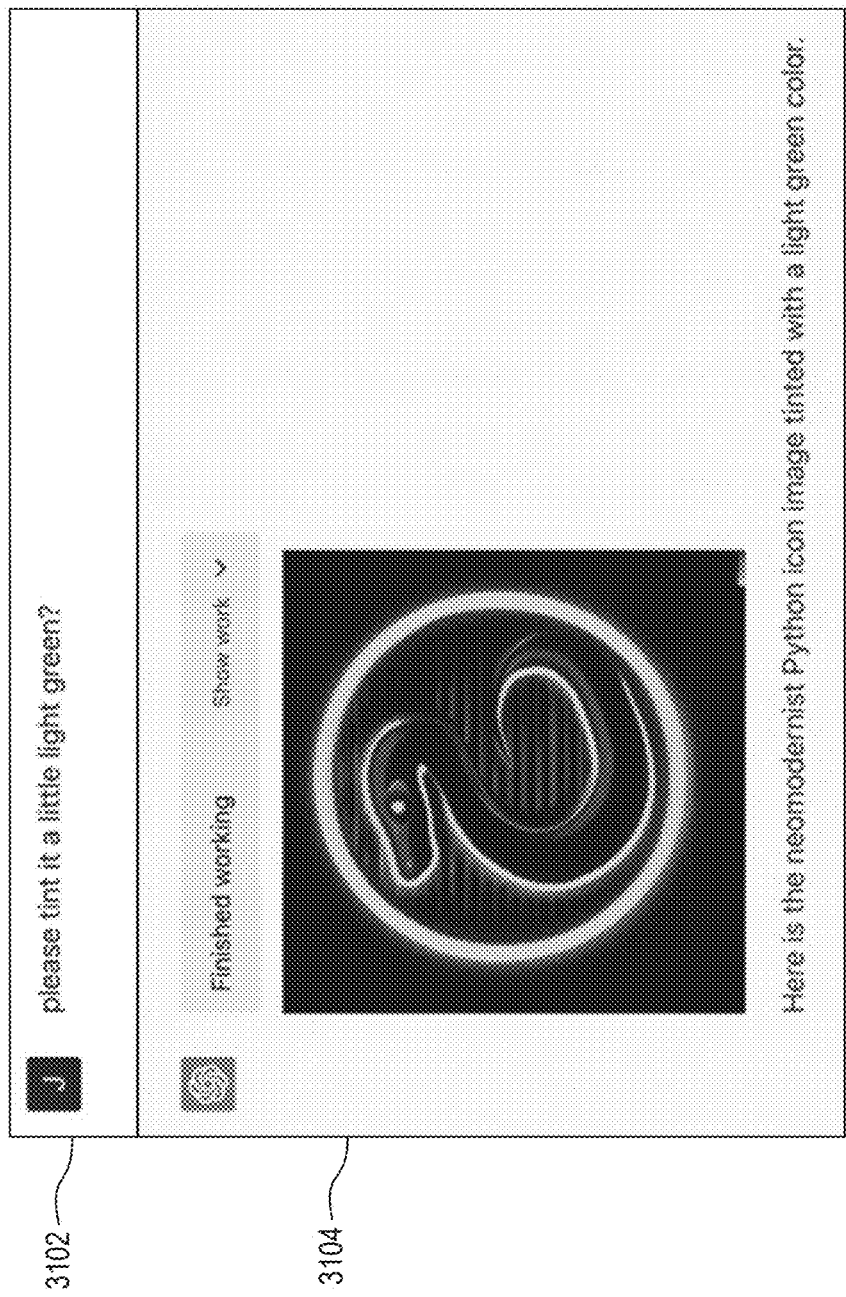
FIG. 31 illustrates a twenty-second exemplary user interface or an exemplary output of the code interpreter in accordance with some embodiments of the present disclosure.

FIG. 31 illustrates a twenty-second exemplary user interface or an exemplary output of the code interpreter in accordance with some embodiments of the present disclosure. FIG. 31 shows an exemplary code interpreter 3100 that includes a prompt 3102 and a response 3104. In this embodiment, the user may utilize prompt 3102 to input a text prompt 3102 request that reads: "please tint it a little light green?" In this embodiment, the user may be referring to inputted image file in prompt 2802 of FIG. 28. Code interpreter 3100 and/or a machine learning model determines that text prompt 3102 requires the implementing of code. Therefore, a machine learning model generates computer code or script based on inputted prompt. Code interpreter executes the computer code or script, wherein the execution of the computer code script includes performing complex data transformation or image transformation of the inputted image file in prompt 2802 of FIG. 28. As further seen in FIG. 31, response 3104 includes displaying, through the user interface, the requested output of the colored image file, along with a description of the colored image file.

Figure 32:
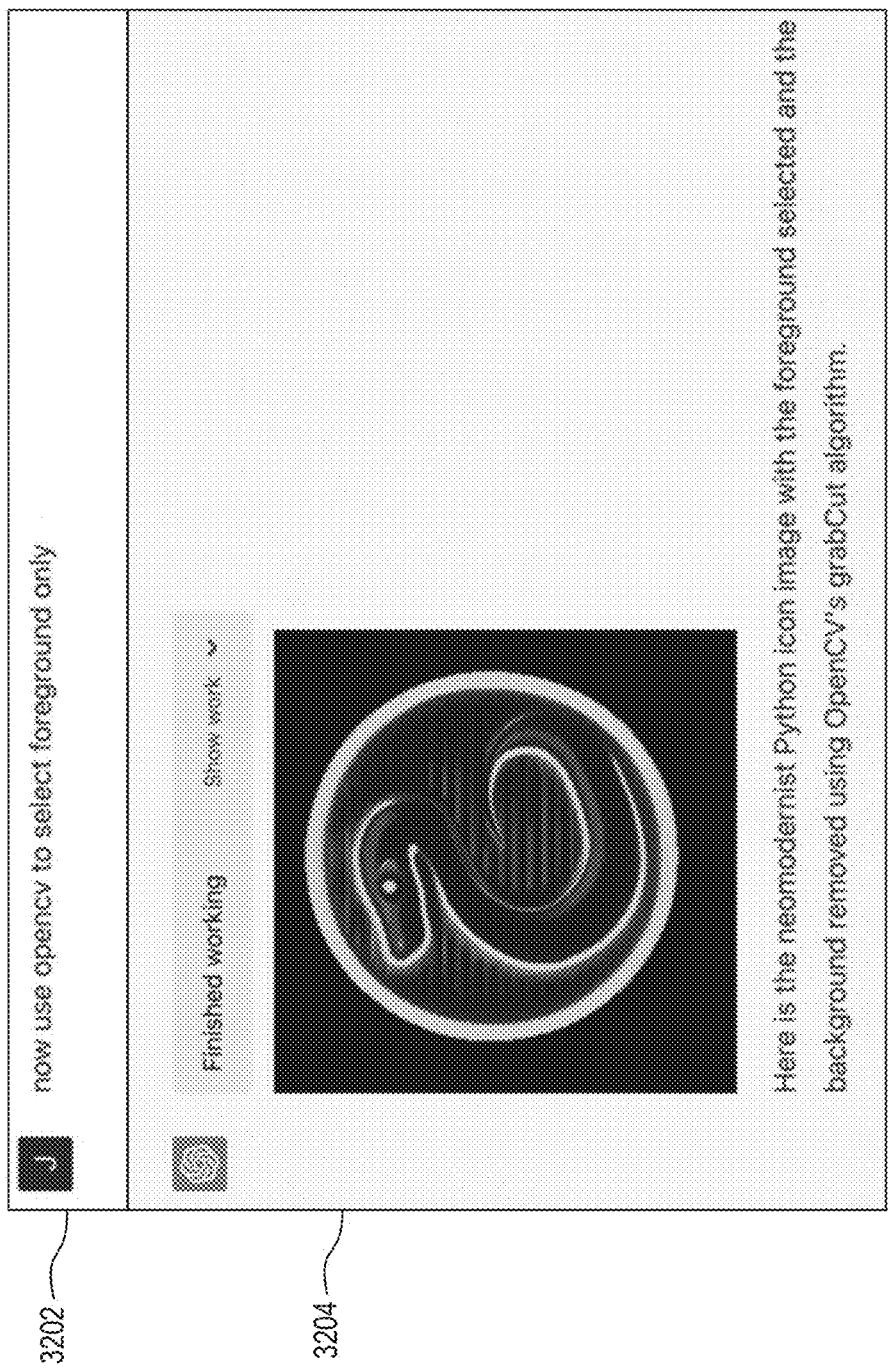
FIG. 32 illustrates a twenty-third exemplary user interface or an exemplary output of the code interpreter in accordance with some embodiments of the present disclosure.

FIG. 32 illustrates a twenty-third exemplary user interface or an exemplary output of the code interpreter in accordance with some embodiments of the present disclosure. FIG. 32 shows an exemplary code interpreter 3200 that includes a prompt 3202 and a response 3204. In this embodiment, the user may utilize prompt 3202 to input a text prompt 3202 request that reads: "now use opencv to select foreground only." In this embodiment, the user may be referring to the inputted image file in prompt 2802 of FIG. 28. Code interpreter 3200 and/or a machine learning model determines that text prompt 3202 requires the implementing of code. Therefore, a machine learning model generates computer code or script based on inputted prompt. Code interpreter executes the computer code or script, wherein the execution of the computer code script includes performing complex data transformation or image transformation of the inputted image file in prompt 2802 of FIG. 28. As further seen in FIG. 32, response 3204 includes displaying, through the user interface, the requested output of the colored image file, along with a description of the colored image file.

Figure 33:
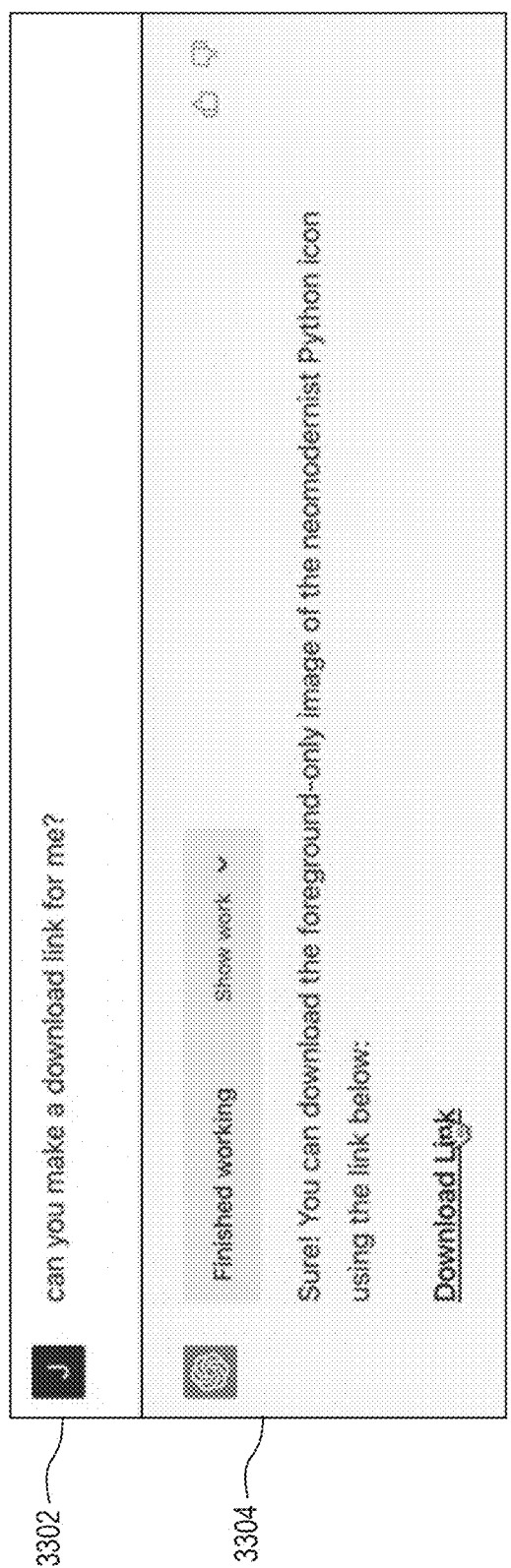
FIG. 33 illustrates a twenty-fourth exemplary user interface or an exemplary output of the code interpreter in accordance with some embodiments of the present disclosure.

FIG. 33 illustrates a twenty-fourth exemplary user interface or an exemplary output of the code interpreter in accordance with some embodiments of the present disclosure. FIG. 33 shows an exemplary code interpreter 3300 that includes a prompt 3302 and a response 3304. In this embodiment, the user may utilize prompt 3302 to input a text prompt 3302 request that reads: "can you make a download link for me?" In this embodiment, the user may be referring to making a download of the inputted image file in prompt 2802 of FIG. 28. Code interpreter 3300 and/or machine learning model determines that text prompt 3302 requires the implementing of code. Therefore, a machine learning model generates computer code or script based on inputted prompt. Code interpreter 3300 executes the computer code or script, wherein the execution of the computer code script includes providing a download link of the aforementioned inputted image file for the user. As further seen in FIG. 33, response 3304 includes displaying, through the user interface, the requested output of a download link of the colored image file, along with a description of the colored image file.

Figure 34:
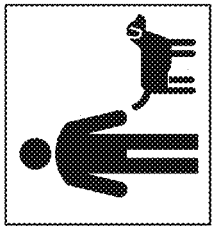
FIG. 34 illustrates a twenty-fifth exemplary user interface or an exemplary output of the code interpreter in accordance with some embodiments of the present disclosure.

FIG. 34 illustrates a twenty-fifth exemplary user interface or an exemplary output of the code interpreter in accordance with some embodiments of the present disclosure. FIG. 34 shows an exemplary code interpreter 3400 that includes input 3402 and output 3404. In this embodiment, the user may utilize input 3402 to input a text prompt request that reads: "Please create an app that I can customize." Code interpreter 3400 and/or a machine learning model determines that the text prompt requires the implementing of code. Therefore, a machine learning model generates code or script based on the inputted text. For example, the machine learning model may generate html code that structures a graphic user interface and its content. In some embodiments, the machine learning model may output the html to a user. In some embodiments, code interpreter 3400 may execute the html code to generate the graphic user interface. After the graphic user interface has been provided, the user may modify the graphic user interface. In some embodiments, the user may select different options for the graphic user interface (e.g., formats, colors, fonts etc.) and/or drag and drop interface elements (e.g., images, audio, video, text boxes, links etc.) The machine learning model may update the html code to reflect the user modifications and code interpreter 3400 may execute the updated html code to generate the modified graphic user interface.

Figure 35:
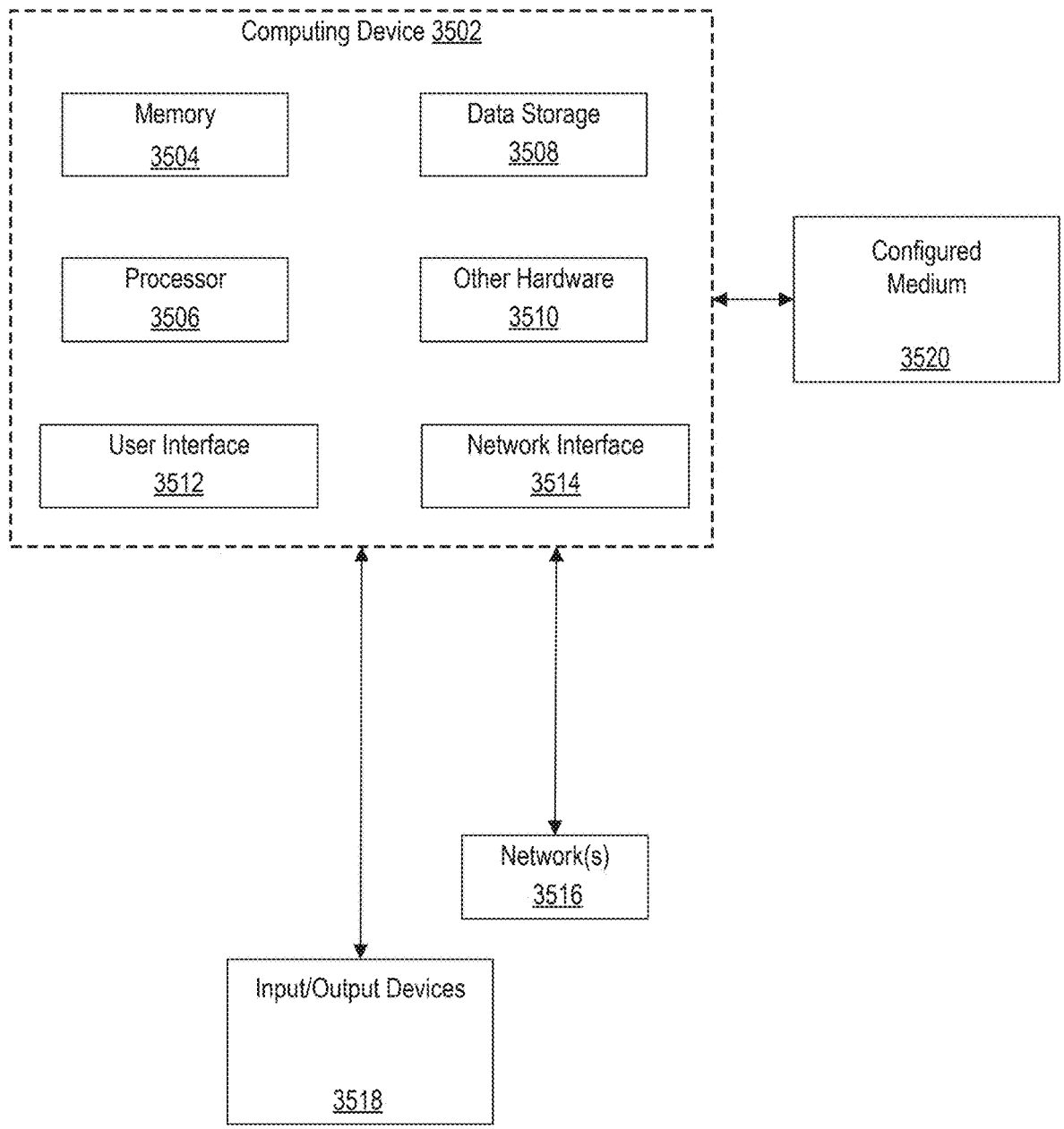
FIG. 35 is a block diagram illustrating an exemplary operating environment for implementing various aspects of this disclosure, according to some embodiments of the present disclosure.

FIG. 35 is a block diagram illustrating an exemplary operating environment for implementing various aspects of this disclosure, according to some embodiments of the present disclosure. An exemplary operating environment for implementing various aspects of this disclosure is illustrated in FIG. 35. As illustrated in FIG. 35, an exemplary operating environment 3500 may include a computing device 3502 (e.g., a general-purpose computing device) in the form of a computer. In some embodiments, computing device 3502 may be associated with a user. Components of the computing device 3502 may include, but are not limited to, various hardware components, such as one or more processors 3506, data storage 3508, a system memory 3504, other hardware 3510, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 35, an operating environment 3500 for an exemplary embodiment includes at least one computing device 3502. The computing device 3502 may be a uniprocessor or multiprocessor computing device. An operating environment 3500 may include one or more computing devices (e.g., multiple computing devices 3502) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 3502 may be configured for end-users, e.g., with applications, for administrators, as a server, as a distributed processing node, as a special-purpose processing device, or otherwise configured to train machine learning models and/or use machine learning models. In some embodiments, multiple computing devices 3502 (e.g., a network of GPUs) may be configured to train a machine learning model.

One or more users may interact with the computer system comprising one or more computing devices 3502 by using a display, keyboard, mouse, microphone, touchpad, camera, sensor (e.g., touch sensor) and other input/output devices 3518, via typed text, touch, voice, movement, computer vision, gestures, and/or other forms of input/output. An input/output device 3518 may be removable (e.g., a connectable mouse or keyboard) or may be an integral part of the computing device 3502 (e.g., a touchscreen, a built-in microphone). A user interface 3512 may support interaction between an embodiment and one or more users. A user interface 3512 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touchscreen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 3518 and computing device 3502, based on input received from at user interface 3512 and/or from network(s) 3516. As used throughout, "based on" may refer to being established or founded upon a use of, changed by, influenced by, caused by, dependent upon, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 3502 in other embodiments, depending on their detachability from the processor(s) 3506. Other computerized devices and/or systems not shown in FIG. 35 may interact in technological ways with computing device 3502 or with another system using one or more connections to a network 3516 via a network interface 3514, which may include network interface equipment, such as a physical network interface controller (NIC) or a virtual network interface (VIF).

Computing device 3502 includes at least one logical processor 3506. The at least one logical processor 3506 may include circuitry and transistors configured to execute instructions from memory (e.g., memory 3504). For example, the at least one logical processor 3506 may include one or more central processing units (CPUs), arithmetic logic units (ALUs), Floating Point Units (FPUs), and/or Graphics Processing Units (GPUs). The computing device 3502, like other suitable devices, also includes one or more computer-readable storage media, which may include, but are not limited to, memory 3504 and data storage 3508. In some embodiments, memory 3504 and data storage 3508 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 3520 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 3502, making its content accessible for interaction with and use by processor(s) 3506. The removable configured medium 3520 is an example of a computer-readable storage medium. Some other examples of computer-readable storage media include built-in random-access memory (RAM), read-only memory (ROM), hard disks, and other memory storage devices which are not readily removable by users (e.g., memory 3504).

The configured medium 3520 may be configured with instructions (e.g., binary instructions) that are executable by a processor 3506; "executable" is used in a broad sense herein to include machine code, interpretable code, byte-code, compiled code, and/or any other code that is configured to run on a machine, including a physical machine or a virtualized computing instance (e.g., a virtual machine or a container). The configured medium 3520 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill may understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 3510 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 3506, memory 3504, data storage 3508, and screens/displays, an operating environment 3500 may also include other hardware 3510, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 3518 such as human user input/output devices (screen, keyboard, mouse, tablet, microphone, speaker, motion sensor, etc.) may be present in operable communication with one or more processors 3506 and memory.

In some embodiments, the system includes multiple computing devices 3502 connected by network(s) 3516. Networking interface equipment can provide access to network (s) 3516, using components (which may be part of a network interface 3514) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

The computing device 3502 may operate in a networked or cloud-computing environment using logical connections to one or more remote devices (e.g., using network(s) 3516), such as a remote computer (e.g., another computing device 3502). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 3502 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Computing device 3502 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may include computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

The data storage 3508 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 3508 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer-readable media for the generation of text and/or code embeddings. For example, in some embodiments, and as illustrated in FIG. 35, an operating environment 3500 may include at least one computing device 3502, the at least one computing device 3502 including at least one processor 3506, at least one memory 3504, at least one data storage 3508, and/or any other component discussed above with respect to FIG. 34.

Figure 36:
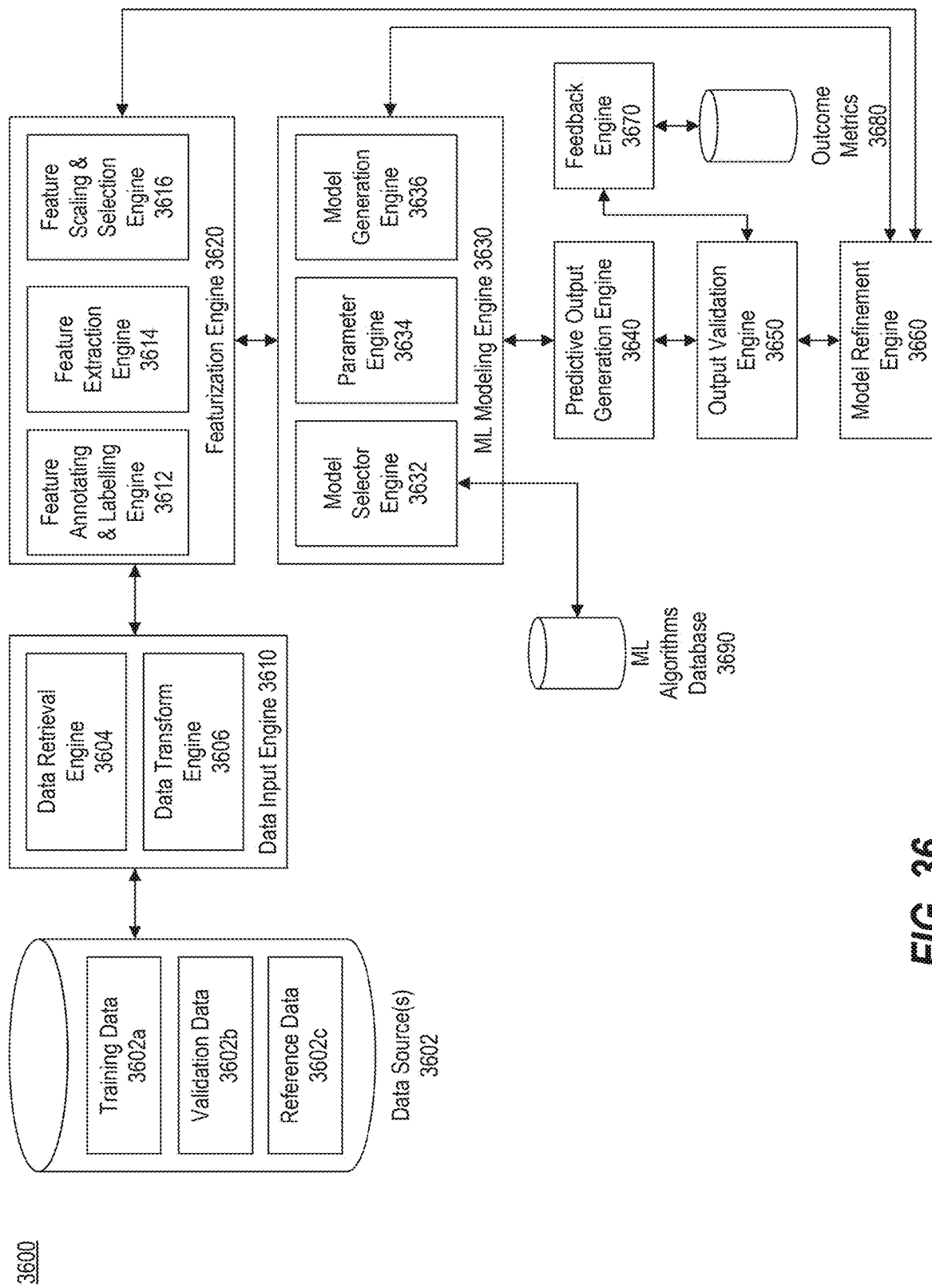
FIG. 36 is a block diagram illustrating an exemplary machine learning platform for implementing various aspects of this disclosure, according to some embodiments of the present disclosure.

FIG. 36 is a block diagram illustrating an exemplary machine learning platform for implementing various aspects of this disclosure, according to some embodiments of the present disclosure.

System 3600 may include data input engine 3610 that can further include data retrieval engine 3604 and data transform engine 3606. Data retrieval engine 3604 may be configured to access, access, interpret, request, or receive data, which may be adjusted, reformatted, or changed (e.g., to be interpretable by other engine, such as data input engine 3610). For example, data retrieval engine 3604 may request data from a remote source using an API. Data input engine 3610 may be configured to access, interpret, request, format, re-format, or receive input data from data source(s) 3602. For example, data input engine 3610 may be configured to use data transform engine 3606 to execute a re-configuration or other change to data, such as a data dimension reduction. Data source(s) 3602 may exist at one or more memories 3504 and/or data storages 3508. In some embodiments, data source(s) 3602 may be associated with a single entity (e.g., organization) or with multiple entities. Data source(s) 3602 may include one or more of training data 3602a (e.g., input data to feed a machine learning model as part of one or more training processes), validation data 3602b (e.g., data against which at least one processor may compare model output with, such as to determine model output quality), and/or reference data 3602c. In some embodiments, data input engine 3610 can be implemented using at least one computing device (e.g., computing device 3502). For example, data from data sources 3602 can be obtained through one or more I/O devices and/or network interfaces. Further, the data may be stored (e.g., during execution of one or more operations) in a suitable storage or system memory. Data input engine 3610 may also be configured to interact with data storage 3508, which may be implemented on a computing device that stores data in storage or system memory. System 3600 may include featurization engine 3620. Featurization engine 3620 may include feature annotating & labeling engine 3612 (e.g., configured to annotate or label features from a model or data, which may be extracted by feature extraction engine 3614), feature extraction engine 3614 (e.g., configured to extract one or more features from a model or data), and/or feature scaling and selection engine 3616. Feature scaling and selection engine 3616 may be configured to determine, select, limit, constrain, concatenate, or define features (e.g., AI features) for use with AI models. System 3600 may also include machine learning (ML) modeling engine 3630, which may be configured to execute one or more operations on a machine learning model (e.g., model training, model re-configuration, model validation, model testing), such as those described in the processes described herein. For example, ML modeling engine 3630 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 3602a) through a machine learning model process (e.g., a training process). In some embodiments, different epochs may have different degrees of supervision (e.g., supervised, semi-supervised, or unsupervised). Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, trillions, or even billions of model parameters. ML modeling engine 3630 may include model selector engine 3632 (e.g., configured to select a model from among a plurality of models, such as based on input data), parameter selector engine 3635 (e.g., configured to add, remove, and/or change one or more parameters of a model), and/or model generation engine 3636 (e.g., configured to generate one or more machine learning models, such as according to model input data, model output data, comparison data, and/or validation data). Similar to data input engine 3610, featurization engine 3620 can be implemented on a computing device. In some embodiments, model selector engine 3632 may be configured to receive input and/or transmit output to ML algorithms database 3690 (e.g., a data storage 3508). Similarly, featurization engine 3620 can utilize storage or system memory for storing data and can utilize one or more I/O devices or network interfaces for transmitting or receiving data. ML algorithms database 3690 (or other data storage 3508) may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a Generative Pre-trained Transformer (GPT) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 3600 can further include predictive output generation engine 3640, output validation engine 3650 (e.g., configured to apply validation data to machine learning model output), feedback engine 3670 (e.g., configured to apply feedback from a user and/or machine to a model), and model refinement engine 3660 (e.g., configured to update or re-configure a model). In some embodiments, feedback engine 3670 may receive input and/or transmit output (e.g., output from a trained, partially trained, or untrained model) to outcome metrics database 3680. Outcome metrics database 3680 may be configured to store output from one or more models and may also be configured to associate output with one or more models. In some embodiments, outcome metrics database 3680, or other device (e.g., model refinement engine 3660 or feedback engine 3670) may be configured to correlate output, detect trends in output data, and/or infer a change to input or model parameters to cause a particular model output or type of model output. In some embodiments, model refinement engine 3660 may receive output from predictive output generation engine 3640 or output validation engine 3650. In some embodiments, model refinement engine 3660 may transmit the received output to featurization engine 3620 or ML modeling engine 3630 in one or more iterative cycles.

Any or each engine of system 3600 may be a module (e.g., a program module), which may be a packaged functional hardware unit designed for use with other components (e.g., at least one processor and a memory component) or a part of a program that performs a particular function (e.g., of related functions). Any or each of these modules may be implemented using a computing device. In some embodiments, the functionality of system 3600 may be split across multiple computing devices to allow for distributed processing of the data, which may improve output speed and reduce computational load on individual devices. In some embodiments, system 3600 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 3600 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized.

The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method comprising:
expanding libraries available for a code interpreter by uploading at least one new package;
receiving, an input comprising at least one of a text prompt, file prompt, or data object;
determining, using a multimodal machine learning model, that the input requires implementing computer code by analyzing the input with the multimodal machine learning model;
in response to determining the input requires implementing the computer code:
generating the computer code based on the input, wherein the computer code is generated by the multimodal machine learning model and is configured to call the expanded libraries based on the analysis of the input;
executing the generated computer code using the code interpreter; and
providing, through an interface, an output based on the generated computer code.

2. The method of claim 1, wherein:
the input comprises a mathematical expression; and
the file prompt comprises at least one of an audio file, an image file, or a video file.

3. The method of claim 1, wherein the input comprises a source code line.

4. The method of claim 1, wherein providing the output comprises generating an output file based on the input.

5. The method of claim 4, further comprising:
providing the output file for download through a user interface.

6. The method of claim 1, wherein executing the generated computer code further comprises:
executing the computer code in a sandboxed, firewalled execution environment.

7. The method of claim 6, wherein executing the generated computer code comprises:
accessing ephemeral disk space.

8. The method of claim 1, further comprising:
executing the generated computer code to provide access to a network, an intranet, or an internet.

9. The method of claim 1, wherein executing the generated computer code comprises:
in response to determining that the output comprises an error, rewriting the computer code based on the error; and executing the rewritten computer code using the code interpreter.

10. The method of claim 1, wherein:
the input comprises the text prompt and the file prompt, wherein the file prompt comprises a data file;
the text prompt comprises a data analysis request of the data file;
generating the computer code comprises generating source code for data analysis of the data file; and
executing the generated computer code comprises performing the data analysis.

11. The method of claim 10, wherein executing the generated computer code comprises:
performing at least one of a complex data transformation, a statistical analysis, or a visualization of data in the received input and generating an output file based on the at least one of the complex data transformation, the statistical analysis, or the visualization.

12. The method of claim 11, wherein the providing the output comprises:
providing the output file for download through a user interface.

13. The method of claim 10, wherein executing the generated computer code comprises:
at least one of detecting, tracking, or counting objects in the data file with the code interpreter.

14. The computing device of claim 10, wherein the input comprises an image.

15. The computing device of claim 14, wherein executing the generated computer code comprises:
detecting a face in the image.

16. The method of claim 14, wherein executing the generated computer code comprises:
extracting text for the image.

17. The method of claim 1, wherein the code interpreter is a PYTHON code interpreter.

18. The method of claim 1, wherein the expanded libraries comprise pre-written and reusable code.

19. A system comprising:
at least one processor; and
at least one non-transitory computer readable medium containing instructions that, when executed by the at least one processor, cause the system to perform operations comprising:
expanding libraries available for a code interpreter by uploading at least one new package;
providing a tool associated with a multimodal machine learning model, the tool comprising a user interface and the code interpreter;
receiving, through the user interface, an input, the input comprising at least one of a text prompt, file prompt, or data object;
determining, using the multimodal machine learning model, whether the input calls for implementing computer code by analyzing the input with the multimodal machine learning model;
in response to determining the input calls for implementing the computer code:
generating the computer code based on the input, wherein the computer code is generated by the multimodal machine learning model and is configured to call the expanded libraries based on the analysis of the input;
executing the generated computer code using the code interpreter; and
displaying, through the user interface, an output based on the generated computer code;
in response to determining the input does not require implementing the computer code:
generating a response based on the input.

20. A server providing access to a multimodal machine learning model, the server comprising:
at least one processor;
a network device connected to the at least one processor; and
a memory device connected to the at least one processor, wherein the memory device stores instructions that, when executed, configure the at least one processor to:
expanding libraries available for a code interpreter by uploading at least one new package;
provide a tool associated with the multimodal machine learning model, the tool comprising a user interface and the code interpreter in the multimodal machine learning model;
receive, through the user interface, an input, the input comprising at least one of a text prompt, file prompt, or data object;
determine, using the multimodal machine learning model, whether the input calls for implementing computer code by analyzing the input with the multimodal machine learning model;
in response to determining the input calls for implementing the computer code:
generating the computer code based on the input, wherein the computer code is generated by the multimodal machine learning model and is configured to call the expanded libraries based on the analysis of the input;
executing the generated computer code using the code interpreter; and
displaying, through the user interface, an output based on the generated computer code;
in response to determining the input does not require implementing the computer code:
generating a response based on the input.

\* \* \* \* \*

UNITED STATES PATENT AND TRADEMARK OFFICE
CERTIFICATE OF CORRECTION

| | | |
|---|---|---|
| PATENT NO. | : 12,498,947 B2 | Page 1 of 1 |
| APPLICATION NO. | : 19/064670 | |
| DATED | : December 16, 2025 | |
| INVENTOR(S) | : Jerry Tworek et al. | |

It is certified that error appears in the above-identified patent and that said Letters Patent is hereby corrected as shown below:

On the Title Page

Item (57) Abstract, Line 4, "receiving, an" should read as --receiving an--.

In the Claims

Claim 1, Column 40, Line 10, "receiving, an" should read as --receiving an--.

Signed and Sealed this
Twentieth Day of January, 2026

John A. Squires
*Director of the United States Patent and Trademark Office*